(12) United States Patent     (10) Patent No.:   US 12,675,117 B2

Reddy et al.     (45) Date of Patent:    Jul. 7, 2026

(54) AUTOMATED UNMANNED AERIAL VEHICLE DOCK VERIFICATION AND LANDING

(71) Applicant: Skydio, Inc., San Mateo, CA (US)

(72) Inventors: Shreetej Varakantam Reddy, San Mateo, CA (US); Davide Falanga, Sunnyvale, CA (US); Maximilian Joseph Halper Krogius, San Mateo, CA (US); Eric Minor, San Mateo, CA (US)

(73) Assignee: Skydio, Inc., San Mateo, CA (US)

( * ) Notice: Subject to any disclaimer, the term of this patent is extended or adjusted under 35 U.S.C. 154(b) by 186 days.

(21) Appl. No.: 18/533,060

(22) Filed: Dec. 7, 2023

(65) Prior Publication Data

US 2024/0192705 A1     Jun. 13, 2024

Related U.S. Application Data

(60) Provisional application No. 63/386,377, filed on Dec. 7, 2022.

(51) Int. Cl.

| | |
|---|---|
| *G05D 1/654* | (2024.01) |
| *B64D 45/08* | (2006.01) |
| *B64F 5/60* | (2017.01) |
| *B64U 70/90* | (2023.01) |
| *G05D 1/244* | (2024.01) |

(Continued)

(52) U.S. Cl.

CPC ............. *G05D 1/654* (2024.01); *B64D 45/08* (2013.01); *B64F 5/60* (2017.01); *B64U 70/90* (2023.01); *G05D 1/2446* (2024.01); *G05D 1/46* (2024.01); *G05D 1/661* (2024.01); *G05D*

*1/86* (2024.01); *G06T 7/73* (2017.01); *G06V 20/17* (2022.01); *B64U 2101/30* (2023.01); *G05D 2101/10* (2024.01); *G05D 2109/20* (2024.01); *G05D 2109/254* (2024.01); *G05D 2111/10* (2024.01);

(Continued)

(58) Field of Classification Search

CPC ............ G05D 1/654; G05D 1/46; G05D 1/86; G05D 1/2446; B64F 5/60; G06T 7/73; G06V 20/17; B64U 70/90

See application file for complete search history.

(56) References Cited

U.S. PATENT DOCUMENTS

| | | |
|---|---|---|
| 2017/0190423 A1 | 7/2017 | Salgueiro et al. |
| 2020/0180791 A1 | 6/2020 | Kimberly et al. |

(Continued)

FOREIGN PATENT DOCUMENTS

| | | | |
|---|---|---|---|
| EP | 3060885 B1 | 9/2020 | |
| WO | WO-2019108174 A1 * | 6/2019 | ............. B64U 80/86 |

*Primary Examiner* — Michael D Lang

(74) *Attorney, Agent, or Firm* — Young Basile Hanlon & MacFarlane, P.C.

(57) ABSTRACT

Autonomous return to dock and docking procedures includes a dock and an unmanned aerial vehicle (UAV). The dock includes a first fiducial and second fiducial. The UAV includes a camera, one or more processors, and one or more memories. The one or more processors configured to execute instructions stored in the one or more memories to determine to use the dock for a landing operation by processing a first image depicting the first fiducial, to determine a UAV placement for the landing operation at the dock by processing a second image depicting the second fiducial, and to perform the landing operation to land the UAV at the dock according to the UAV placement.

20 Claims, 14 Drawing Sheets

(51) Int. Cl.

| | |
|---|---|
| *G05D 1/46* | (2024.01) |
| *G05D 1/661* | (2024.01) |
| *G05D 1/86* | (2024.01) |
| *G06T 7/73* | (2017.01) |
| *G06V 20/17* | (2022.01) |
| *B64U 101/30* | (2023.01) |
| *G05D 101/10* | (2024.01) |
| *G05D 109/20* | (2024.01) |
| *G05D 109/25* | (2024.01) |
| *G05D 111/10* | (2024.01) |

(52) U.S. Cl.
CPC .............. *G06T 2207/10032* (2013.01); *G06T 2207/30204* (2013.01)

(56) References Cited

U.S. PATENT DOCUMENTS

| | | |
|---|---|---|
| 2020/0391878 A1 | 12/2020 | Woodman et al. |
| 2022/0047138 A1* | 2/2022 | Wong ................... G05D 1/0244 |
| 2022/0399936 A1 | 12/2022 | Arksey et al. |

\* cited by examiner

800

804
EXTERNAL
ENCLOSURE
CAMERA

806
INTERNAL
ENCLOSURE
CAMERA

808
BATTERY POWER
METER

802
PROCESSING DEVICE

810
UAV NAVIGATION
CAMERA

812
UAV GIMBALLED
CAMERA

814
MICROPHONE

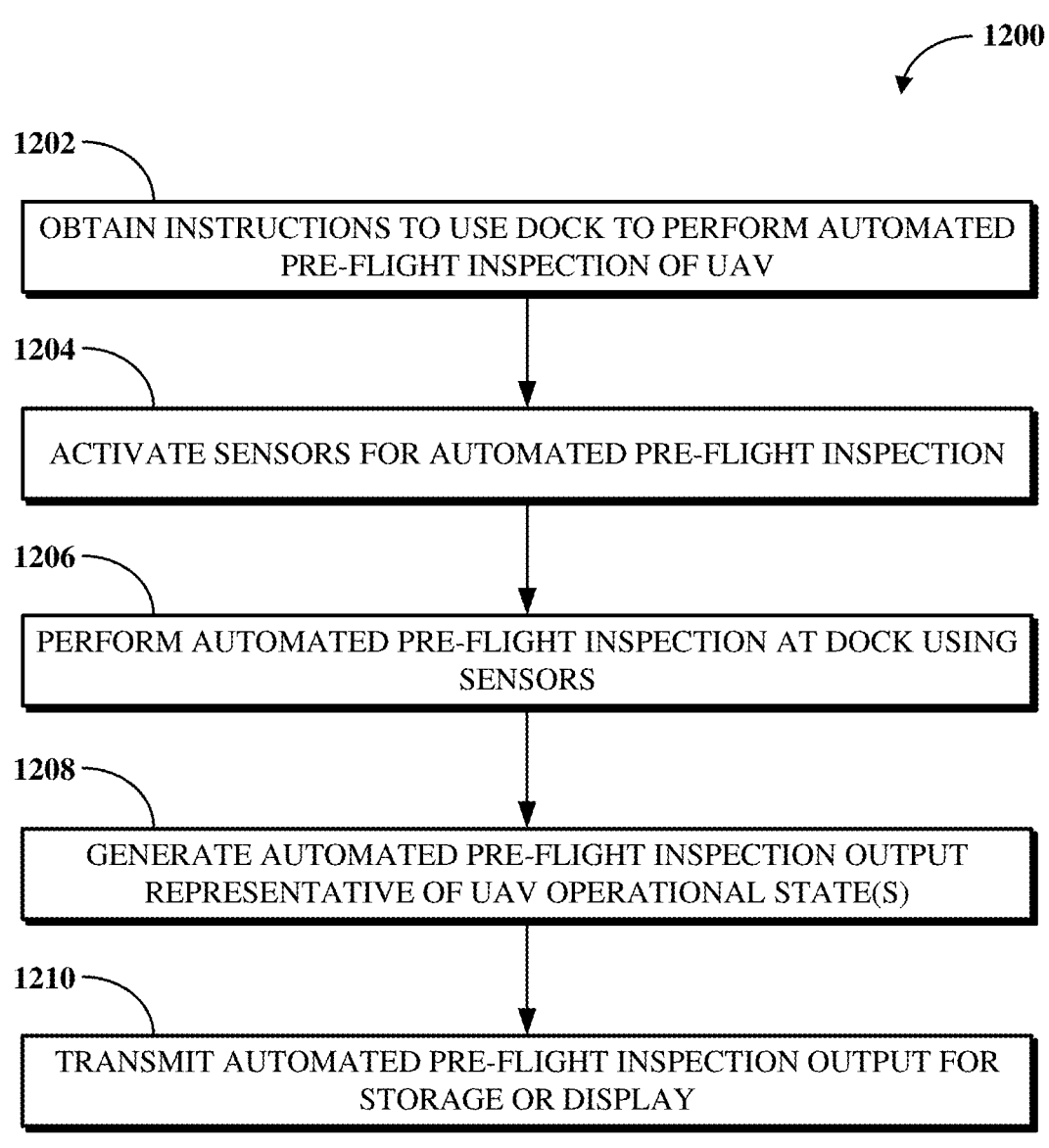

1200

1202 — OBTAIN INSTRUCTIONS TO USE DOCK TO PERFORM AUTOMATED PRE-FLIGHT INSPECTION OF UAV

1204 — ACTIVATE SENSORS FOR AUTOMATED PRE-FLIGHT INSPECTION

1206 — PERFORM AUTOMATED PRE-FLIGHT INSPECTION AT DOCK USING SENSORS

1208 — GENERATE AUTOMATED PRE-FLIGHT INSPECTION OUTPUT REPRESENTATIVE OF UAV OPERATIONAL STATE(S)

1210 — TRANSMIT AUTOMATED PRE-FLIGHT INSPECTION OUTPUT FOR STORAGE OR DISPLAY

1302 — CAPTURE, USING UAV CAMERA, ONE OR MORE IMAGES DEPICTING FIRST AND SECOND FIDUCIALS OF DOCK

1304 — DETERMINE, BASED ON DEPICTION OF FIRST FIDUCIAL, TO USE DOCK FOR LANDING OPERATION

1306 — DETERMINE, BASED ON DEPICTION OF SECOND FIDUCIAL, UAV PLACEMENT FOR LANDING OPERATION AT DOCK

1308 — PERFORM LANDING OPERATION TO LAND UAV AT DOCK ACCORDING TO UAV PLACEMENT

AUTOMATED UNMANNED AERIAL VEHICLE DOCK VERIFICATION AND LANDING

CROSS-REFERENCE TO RELATED APPLICATION(S)

This application claims the benefit of U.S. Provisional Application Ser. No. 61/267,786, filed Dec. 7, 2023, the entire disclosure of which is herein incorporated by reference.

TECHNICAL FIELD

This application generally relates to automated unmanned aerial vehicle (UAV) operations involving docks, and, more specifically, to performing automated pre-flight UAV inspections and/or automated UAV dock verification and landing operations.

BACKGROUND

UAVs are complex and include multiple components and sub-systems used for navigation and other functionality, for example, propulsion systems for enabling movement of the UAV within an environment, vision systems for obstacle avoidance and other navigation operations, propellers used by the propulsion systems, cameras used by the vision systems, and the like. The operational states of these components and sub-systems can be affected by use, and maintenance may sometimes be necessary to restore relevant functionality.

A UAV may launch from a dock to begin navigating within an environment (e.g., to perform an inspection). When the UAV navigation is complete, the UAV may return, or be returned, to the dock for battery recharging, safe transportation, and the like. To return to a dock, a UAV performs a landing operation including location the dock and lowering into a suitable position about the dock. This landing operation generally requires precise movement and may be performed manually (i.e., controlled by a user device) or automatically by the UAV.

SUMMARY

Systems and techniques for, inter alia, automated pre-flight UAV inspection are disclosed.

In some implementations, a system for automated pre-flight UAV inspection comprises: a UAV including one or more cameras, one or more sub-systems, and a frame; and a dock including one or more processors, one or more memories, and one or more sensors configured for use with an automated pre-flight inspection of the UAV while the UAV is located at the dock, wherein the one or more processors are configured to execute instructions stored in the one or more memories to: perform the automated pre-flight inspection using the one or more sensors to produce output representing operational states of the one or more cameras, the one or more sub-systems, and one or more portions of the frame; and transmit the output for display at a user device associated with the UAV.

In some implementations of the system, to perform the automated pre-flight inspection, the one or more processors are configured to execute the instructions to: determine, for each of the one or more cameras, a first operational state indicating whether a lens of the camera is clean; determine, for each of the one or more sub-systems, a second operational state indicating a condition of the sub-system; and determine, for each of the one or more portions of the frame, a third operational state indicating an extent of damage to the portion.

In some implementations of the system, the one or more portions of the frame correspond to a body of the UAV and multiple arms of the UAV, and wherein the third operational state determined for an arm of the multiple arms indicates whether the arm is extended and locked.

In some implementations of the system, the one or more sub-systems include one or more of a propulsion system, an electrical system, a vision system, a navigation system, a command and control system, or a battery system and the second operational states are determined by performing tests against the each of the one or more sub-systems.

In some implementations of the system, to determine the third operational state for the propulsion system, the one or more processors are configured to execute the instructions to: cause propellers of the propulsion system to rotate according to input obtained from the user device; and capture, using the one or more sensors, data based on the rotation of the propellers.

In some implementations of the system, the one or more sensors include one or more dock lights configured to illuminate during the automated pre-flight inspection and one or more dock cameras configured to capture visual data depicting the UAV during the automated pre-flight inspection.

In some implementations of the system, the dock includes an enclosure defining a window configured to receive the UAV to allow for entry of the UAV into the dock and exit of the UAV from the station, and wherein the one or more dock cameras include a first dock camera internal to the enclosure and a second dock camera external to the enclosure.

In some implementations of the system, the visual data is streamed to the user device during the automated pre-flight inspection.

In some implementations of the system, the automated pre-flight inspection is performed in response to a signal, from the user device, indicating to prepare the UAV for flight.

In some implementations of the system, the automated pre-flight inspection is performed according to a schedule defined for one or both of the dock or the UAV.

In some implementations, non-transitory computer readable media store instructions operable to cause one or more processors of a dock to perform operations for automated pre-flight UAV inspection, in which the operations comprise: determining to perform an automated pre-flight inspection of a UAV while the UAV is located at the dock; performing the automated pre-flight inspection using one or more sensors to produce output representing operational states of the UAV; and enabling a launch process for the UAV to exit the dock based on the output.

In some implementations of the non-transitory computer readable media, the operations comprise: transmitting the output for display at a user device associated with the UAV, wherein the launch process is enabled according to a signal from the user device.

In some implementations of the non-transitory computer readable media, the determination to perform the automated pre-flight inspection is signaled from the user device, the output includes visual data captured using one or more cameras, and the visual data is streamed to the user device during the automated pre-flight inspection.

In some implementations of the non-transitory computer readable media, the one or more cameras include one or more of a camera of the dock, a gimbal camera of the UAV, or a navigation camera of the UAV.

In some implementations of the non-transitory computer readable media, the determination to perform the automated pre-flight inspection is performed using output of an artificial intelligence model trained for use with one or both of the UAV or the dock.

In some implementations, a method for automated pre-flight UAV inspection comprises: obtaining instructions to use a dock to perform an automated pre-flight inspection of a UAV while the UAV is located at the dock; performing, using one or more sensors available for use in connection with the automated pre-flight inspection, the automated pre-flight inspection to determine operational states of each of one or more cameras of the UAV, one or more subsystems of the UAV, and a frame of the UAV; and transmitting output representative of the operational states to a computing device for storage or display.

In some implementations of the method, the instructions are obtained from a user device, and performing the automated pre-flight inspection comprises: obtaining, from the user device during the automated pre-flight inspection, second instructions produced via interactions with a user interface at the user device; and performing at least a portion of the automated pre-flight inspection according to the second instructions.

In some implementations of the method, the method comprises: streaming information associated with the automated pre-flight inspection to the user device during the automated pre-flight inspection.

In some implementations of the method, the computing device is the user device.

In some implementations of the method, the method comprises: enabling a launch process for the UAV to exit the dock based on the operational states.

Systems and techniques for, inter alia, automated UAV dock verification and landing are disclosed.

In some implementations, a system for automated UAV dock verification and landing comprises: a dock including a body and a cradle configured to extend beyond the body to receive a UAV and to retract within the body in response to receiving the UAV, wherein a first fiducial is located on the body and a second fiducial is located on the cradle; and a UAV including a camera, one or more processors, and one or more memories, wherein the one or more processors are configured to execute instructions stored in the one or more memories to: determine to use the dock for a landing operation by processing a first image, captured using the camera, depicting the first fiducial; determine a UAV placement for the landing operation at the dock by processing a second image, captured using the camera, depicting the second fiducial; and perform the landing operation to land the UAV at the dock according to the UAV placement.

In some implementations of the system, the first fiducial is used to identify the dock from amongst multiple docks within an environment in which the UAV is navigating while the first image is captured.

In some implementations of the system, to determine to use the dock for the landing operation, the one or more processors are configured to execute the instructions to: process the first image to identify the first fiducial; and verify the dock for the landing operation according to an identifier corresponding to the first fiducial, wherein different fiducials located on other docks of the multiple docks correspond to different identifiers.

In some implementations of the system, to process the first image to identify the first fiducial, the one or more processors are configured to execute the instructions to: predict the first fiducial based on an arrangement of dots depicted within the first image.

In some implementations of the system, to verify the dock for the landing operation according to an identifier, the one or more processors are configured to execute the instructions to: determine, based on the identifier, that the UAV launched from the dock.

In some implementations of the system, the one or more processors are configured to execute the instructions to: scan a ground area within the environment to identify the multiple docks.

In some implementations of the system, to determine the UAV placement for the landing operation at the dock, the one or more processors are configured to execute the instructions to: process the second image to identify the second fiducial; verify positional information of the cradle according to an identifier corresponding to the second fiducial; and determine the UAV placement based on the positional information.

In some implementations of the system, to perform the landing operation to land the UAV at the dock according to the UAV placement, the one or more processors are configured to execute the instructions to: adjust one or more of a position for the UAV, a roll for the UAV, a pitch for the UAV, or a yaw for the UAV according to the UAV placement In some implementations of the system, the positional information corresponds to one or more of locations of one or more corners of the cradle or an orientation of the cradle in a multi-dimensional space.

In some implementations of the system, the determination to use the dock for the landing operation causes a door of the dock to open and causes the cradle to extend beyond the body.

In some implementations, a UAV configured for automated UAV dock verification and landing comprises: one or more cameras; one or more memories; and one or more processors configured to execute instructions stored in the one or more memories to: capture, using the one or more cameras, one or more images within an environment in which the UAV is navigating; determine that the one or more images depict a first fiducial of a dock within the environment; determine, based on the depiction of the first fiducial, to use the dock for a landing operation; determine that the one or more images depict a second fiducial of the dock; determine, based on the depiction of the second fiducial, a UAV placement for the landing operation at the dock; and perform the landing operation to land the UAV at the dock according to the UAV placement.

In some implementations of the UAV, the one or more images are captured based on a scanning operation identifying the dock within the environment.

In some implementations of the UAV, the first fiducial is used to identify the dock from amongst multiple docks within the environment.

In some implementations of the UAV, the UAV placement specifies one or more of a position for the UAV, a roll for the UAV, a pitch for the UAV, or a yaw for the UAV.

In some implementations of the UAV, the first fiducial is located on a body of the dock and the second fiducial is located on a cradle configured to receive the UAV.

In some implementations, a method for automated UAV dock verification and landing comprises: obtaining, using a camera of a UAV, one or more images depicting a first fiducial of a dock and a second fiducial of the dock; determining, according to the depiction of the first fiducial within the one or more images, to use the dock for a landing operation for the UAV; determining, according to the depiction of the second fiducial within the one or more images and based on the determination to use the dock for the landing operation, a UAV placement for the landing operation at the dock; and causing, based on the UAV placement, a performance of the landing operation to land the UAV at the dock.

In some implementations of the method, determining to use the dock for the landing operation for the UAV comprises: verifying the dock for the landing operation from amongst multiple docks located within an environment in which the UAV navigates while the first image is captured.

In some implementations of the method, verifying the dock for the landing operation comprises: determining an identifier corresponding to the first fiducial; and determining, using the identifier, that the UAV launched from the dock.

In some implementations of the method, determining the UAV placement for the landing operation at the dock comprises: determining a manner which to orient and position the UAV based on information associated with the second fiducial.

In some implementations of the method, the first fiducial is located on a body of the dock and the second fiducial is located on a cradle configured to receive the UAV.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 12 is a flowchart of an example of a technique for automated pre-flight UAV inspection.

DETAILED DESCRIPTION

Figure 1:
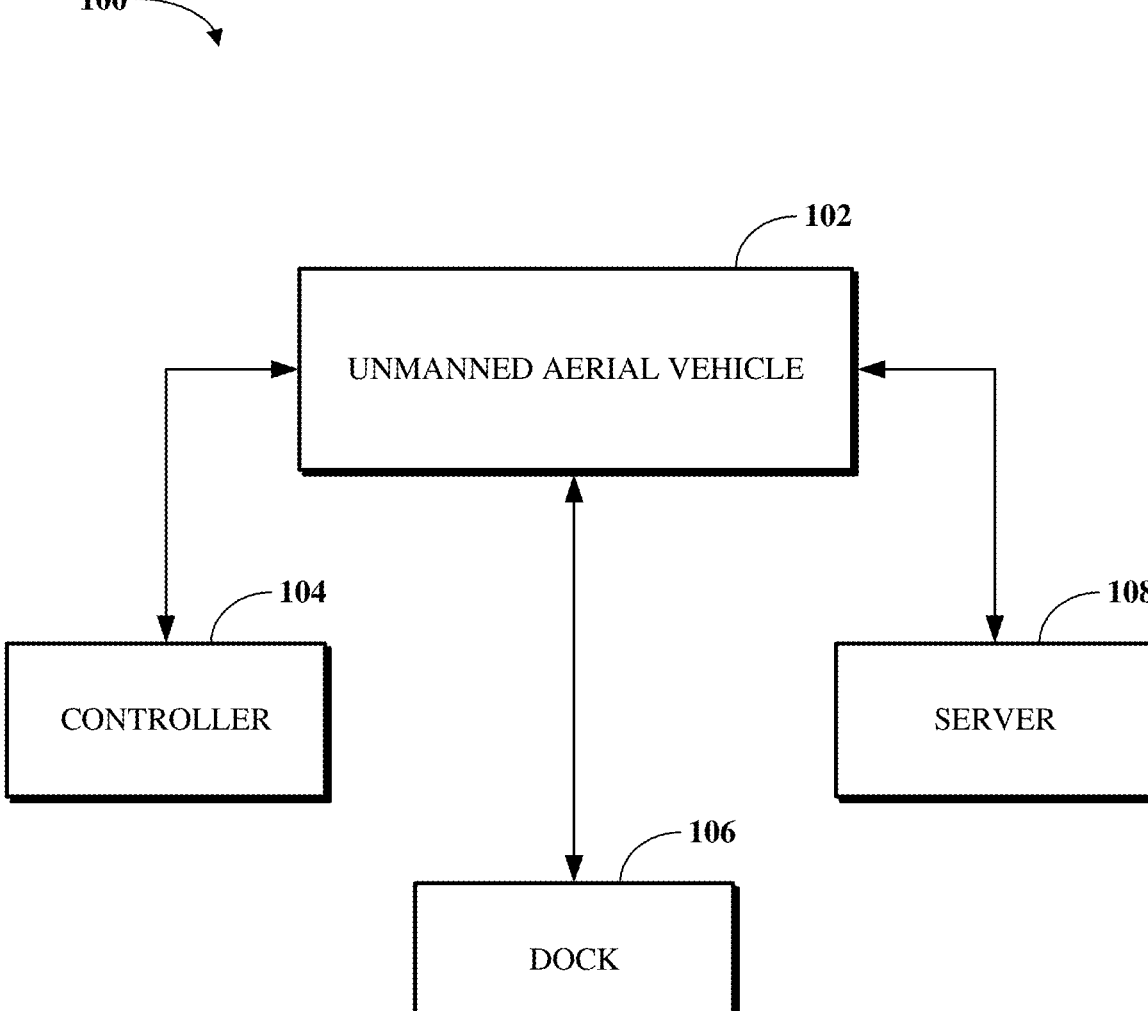
FIG. 1 is an illustration of an example of a UAV system.

Responsible UAV operation, such as to ensure the safe and functional use of a UAV, involves regular inspection of the UAV including its many parts. Obfuscated camera lenses, damaged hardware, or malfunctioning systems can result in inaccurate navigation or dangerous flight conditions that can affect the performance of the UAV and/or create a risk of injury to person or property. While there may be reasons to inspect a UAV after it completes a flight, it is generally prudent to inspect a UAV before it begins a flight (i.e., as a pre-flight inspection) to ensure that the UAV is capable of safely and functionally performing the forthcoming flight. Furthermore, in many cases, such pre-flight inspections may be mandated by a regulatory agency, for example, the United States Federal Aviation Administration (FAA). For example, the FAA today requires that UAV operators perform a complete pre-flight UAV inspection prior to flight within national airspace.

Conventional pre-flight UAV inspection processes require manual observation by an inspector (e.g., a UAV operator or other skilled person), who carefully evaluates the UAV components (e.g., cameras and propellers) and accessible aspects of sub-systems (e.g., navigation and propulsion systems) to the best of their ability. Typically, this manual process involves the inspector checking such components and accessible sub-system aspects for damage or other undesirable conditions (e.g., dirty camera lenses) and declaring the UAV safe or unsafe for flight as a result. However, the manual inspection of a UAV is a tedious, time-consuming, and prone to error via false positives and/or false negatives. For example, it may be overly burdensome for the inspector to access portions of the UAV at which damage or an undesirable condition may be observed. In another example, the inspector may not be able to observe such damage or other undesirable condition due to environmental or user issues, such as poor lighting within the inspection environment or human vision concerns.

Implementations of this disclosure address problems such as these using automated UAV dock operations, specifically, by performing automated pre-flight UAV inspection using a dock at which a UAV is located. Many UAVs today are used with a dock, which operates mainly as a launch and landing point for the UAV but may also provide other functionality by way of one or more sensors accessible to (i.e., integrated or otherwise in communication with a processing device of) the dock. Because these UAVs remain docked (i.e., within or otherwise about, such as atop, a dock) prior to flight, the docks, and thus the sensors accessible thereto, are available for use in inspecting a docked UAV prior to its flight. The dock includes a processing device configured to determine to perform a pre-flight UAV inspection, for example, based on a defined schedule, an indication that the UAV will fly in a near term (e.g., within a threshold period of time), or an instruction initiated at a computing device (e.g., a server or user device). To perform an automated UAV pre-flight inspection, the dock leverages one or more sensors (e.g., cameras, lights, onboard sensors, external sensors, or a combination thereof) to visually and/or otherwise inspect one or more cameras, one or more sub-systems (e.g., navigation or propulsion systems), and/or a frame (e.g., including the body, arms, and propellers) of the UAV. For example, the dock may perform a visual inspection of a propulsion system by utilizing one or more cameras of the dock and/or the UAV to inspect the propeller blades for damage. In another example, the dock may perform a check of an electrical system of the UAV by communicating between the dock and the UAV and receiving diagnostic data from the UAV. The output of the automated UAV pre-flight inspection may then be transmitted, such as for storage or display, to a computing device (e.g., a computing device from which instructions to perform the pre-flight inspection were initiated or another device).

Once a UAV has completed its flight, or upon another determination to end a current flight, the UAV may be returned to a dock. For example, the dock may be recognizable by the UAV while in-flight and may serve as a safe means of transporting the UAV between locations. Landing operations performed to return a UAV to its dock may be manual (e.g., controlled via a user device) or automated (e.g., controlled by the UAV). For example, automated landing approaches may include using a navigation or gimballed camera of the UAV to visually detect the dock within an environment in which the UAV is flying and then calculating a flight path to a landing location about the dock, such as using visual cues from the dock. Nevertheless, regardless of whether it is manual or automated, performing a landing operation for a UAV to land within or otherwise on a dock requires precision in even the best of conditions. Thus, where conditions are poor, such as due to low light availability or inclement weather, automated approaches may suffer in their ability or otherwise entirely fail to properly land a UAV at a dock.

Separately, in some cases, there may be multiple docks deployed within a single environment in which a UAV is flying. For example, the UAV may be one of multiple UAVs involved in a property or terrain inspection or in a recreational outing. Where two or more UAVs share a same dock or dock type, a UAV may, by way of conventional dock recognition approaches, navigate to an incorrect dock and perform a landing operation therewith. This may result in one or more undesirable outcomes, such as the wrong operator leaving the environment with the wrong dock, a UAV being mishandled as it is moved from one dock to another, or a UAV being stolen. Despite this, conventional automated landing approaches lack sophistication to distinguish between like docks. Manual landing approaches, as will be understood, suffer from the same drawbacks, but additionally suffer in that they rely entirely upon the UAV operator to accurately identify their specific dock. That is, even a well-trained remote pilot in command (RPIC) may experience significant challenges when performing a landing operation where poor connection speeds, low image resolution, or other issues with the receiving computer do not present suitable information for distinguishing between docks.

Implementations of this disclosure address problems such as these using automated UAV dock operations, specifically, by performing automated UAV dock verification and landing. The automated UAV dock verification and landing approaches disclosed herein use advanced visual navigation and computer vision techniques to locate a corresponding dock for a UAV and to cause a performance of a landing operation for the UAV at a suitable UAV placement about the dock. A dock according to the implementations of this disclosure includes a first fiducial located on a main body portion thereof and a second fiducial located on a cradle thereof. The first fiducial encodes information usable to determine an identity of the dock for a UAV. The second fiducial encodes information usable to determine a UAV placement for landing the UAV at the dock (i.e., within or atop the cradle). Thus, using fiducial processing, communication between the dock and the UAV, and external sensors and lights, the UAV can locate and land at the associated dock. As such, even in poor weather and lighting conditions an automated landing procedure can still perform a proper landing at a correct dock. Additionally, even if the connection between the UAV and the user device of the RPIC cannot support a live stream from the UAV, the UAV can perform an autonomous return to dock procedure.

To describe some implementations in greater detail, reference is first made to examples of hardware and software structures used to implement an automated UAV dock operation system. FIG. 1 is an illustration of an example of a UAV system 100. The system 100 includes a UAV 102, a controller 104, a dock 106, and a server 108.

The UAV 102 is a vehicle which may be controlled autonomously by one or more onboard processing aspects or remotely controlled by an operator, for example, using the controller 104. The UAV 102 may be implemented as one of a number of types of unmanned vehicle configured for aerial operation. For example, the UAV 102 may be a vehicle commonly referred to as a drone but may otherwise be an aircraft configured for flight within a human operator present therein. In particular, the UAV 102 may be a multi-rotor vehicle. For example, the UAV 102 may be lifted and propelled by four fixed-pitch rotors in which positional adjustments in-flight may be achieved by varying the angular velocity of each of those rotors.

The controller 104 is a device configured to control at least some operations associated with the UAV 102. The controller 104 may communicate with the UAV 102 via a wireless communications link (e.g., via a Wi-Fi network, a Bluetooth link, a ZigBee link, or another network or link) to receive video or images and/or to issue commands (e.g., take off, land, follow, manual controls, and/or commands related to conducting an autonomous or semi-autonomous navigation of the UAV 102). The controller 104 may be or include a specialized device. Alternatively, the controller 104 may be or includes a mobile device, for example, a smartphone, tablet, laptop, or other device capable of running software configured to communicate with and at least partially control the UAV 102.

The dock 106 is a structure which may be used for takeoff and/or landing operations of the UAV 102. In particular, the dock 106 may include one or more fiducials usable by the UAV 102 for autonomous takeoff and landing operations. For example, the fiducials may generally include markings which may be detected using one or more sensors of the UAV 102 to guide the UAV 102 from or to a specific position on or in the dock 106. In some implementations, the dock 106 may further include components for charging a battery of the UAV 102 while the UAV 102 is on or in the dock 106. The dock 106 may be a protective enclosure from which the UAV 102 is launched. A location of the dock 106 may correspond to the launch point of the UAV 102.

The server 108 is a remote computing device from which information usable for operation of the UAV 102 may be received and/or to which information obtained at the UAV 102 may be transmitted. For example, the server 108 may be used to train a learning model usable by one or more aspects of the UAV 102 to implement functionality of the UAV 102. In another example, signals including information usable for updating aspects of the UAV 102 may be received from the server 108. The server 108 may communicate with the UAV 102 over a network, for example, the Internet, a local area network, a wide area network, or another public or private network.

In some implementations, the system 100 may include one or more additional components not shown in FIG. 1. In some implementations, one or more components shown in FIG. 1 may be omitted from the system 100, for example, the server 108.

Figure 2A:
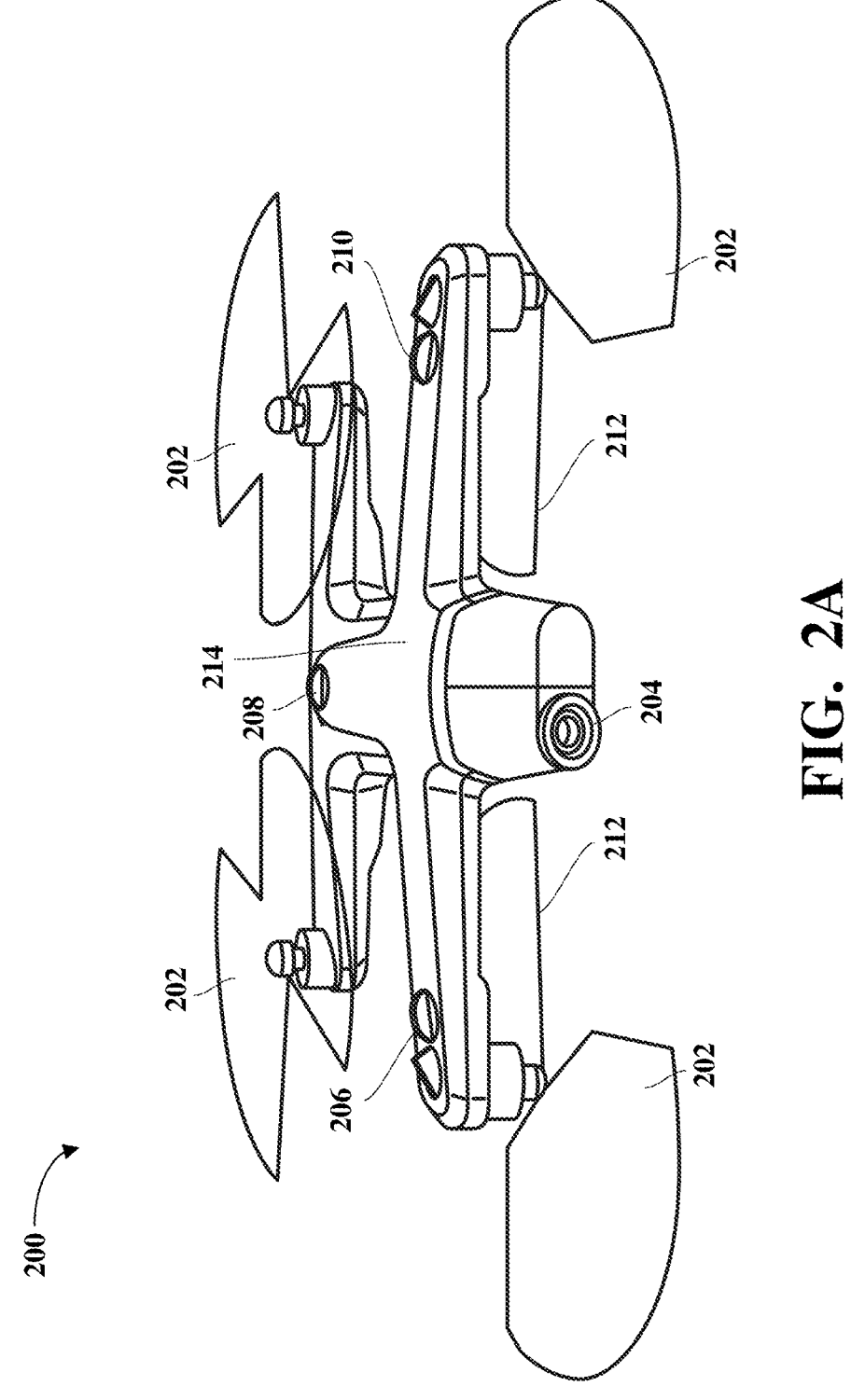
FIG. 2A is an illustration of an example of a UAV as seen from above.
Figure 2B:
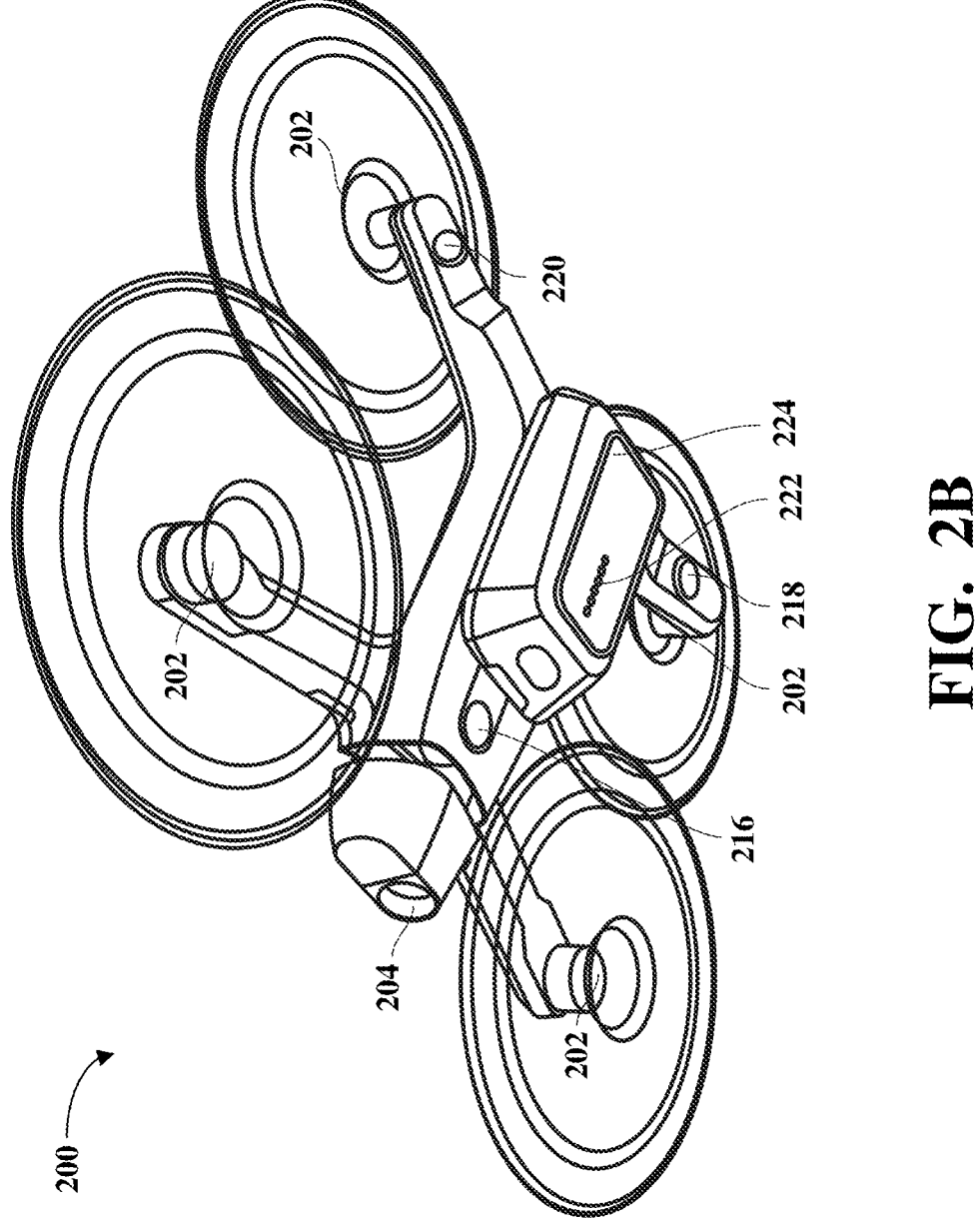
FIG. 2B is an illustration of an example of a UAV as seen from below.

An example illustration of a UAV 200, which may, for example, be the UAV 102 shown in FIG. 1, is shown in FIGS. 2A-B. FIG. 2A is an illustration of an example of the UAV 200 as seen from above. The UAV 200 includes a propulsion mechanism 202 including some number of propellers (e.g., four) and motors configured to spin the propellers. For example, the UAV 200 may be a quad-copter drone. The UAV 200 includes image sensors, including a high-resolution image sensor 204. This image sensor 204 may, for example, be mounted on a gimbal to support steady, low-blur image capture and object tracking. The UAV 200 also includes image sensors 206, 208, and 210 that are spaced out around the top of the UAV 200 and covered by respective fisheye lenses to provide a wide field of view and support stereoscopic computer vision. The image sensors 206, 208, and 210 generally have a resolution which is lower than a resolution of the image sensor 204. Additionally, the UAV 200 includes a number of arms 212 (e.g., four). The propulsion mechanisms 202 may be mounted to the arms 212. The arms 212 are attached the body 214 of the UAV 200. The propulsion mechanisms 202, the arms 212, and the body 214 may collectively be referred to as the frame of the UAV 200. The UAV 200 also includes other internal hardware, for example, a processing apparatus (not shown). In some implementations, the processing apparatus is configured to automatically fold the propellers when entering a dock (e.g., the dock 106 shown FIG. 1), which may allow the dock to have a smaller footprint than the area swept out by the propellers of the propulsion mechanism 202.

FIG. 2B is an illustration of an example of the UAV 200 as seen from below. From this perspective, three more image sensors 216, 218, and 220 arranged on the bottom of the UAV 200 may be seen. These image sensors 216, 218, and 220 may also be covered by respective fisheye lenses to provide a generally wide field of view and support stereoscopic computer vision. The various image sensors of the UAV 200 may enable visual inertial odometry (VIO) for high resolution localization and obstacle detection and avoidance. For example, the image sensors may be used to capture images including infrared data which may be processed for day or night mode navigation of the UAV 200. The UAV 200 also includes a battery in battery pack 224 attached on the bottom of the UAV 200, with conducting contacts 222 to enable battery charging. The bottom surface of the battery pack 224 may be a bottom surface of the UAV 200.

Figure 3:
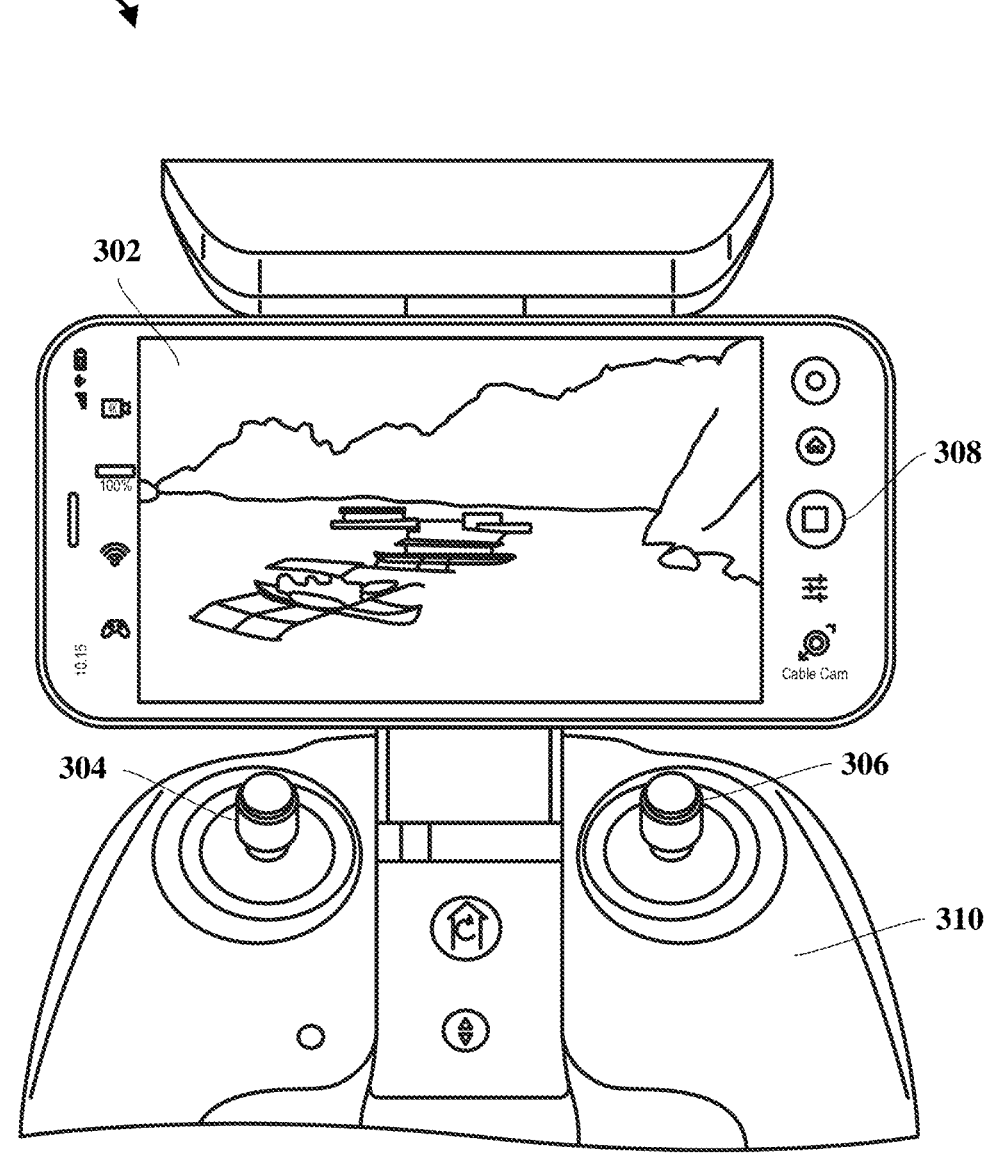
FIG. 3 is an illustration of an example of a controller for a UAV.

FIG. 3 is an illustration of an example of a controller 300 for a UAV, which may, for example, be the UAV 102 shown in FIG. 1. The controller 300 may, for example, be the controller 104 shown in FIG. 1. The controller 300 may provide a user interface for controlling the UAV and reviewing data (e.g., images) received from the UAV. The controller 300 includes a touchscreen 302, a left joystick 304, and a right joystick 306. In the example as shown, the touchscreen 302 is part of a mobile device 308 (e.g., a smartphone) that connects to a controller attachment 310, which, in addition to providing additional control surfaces including the left joystick 304 and the right joystick 306, may provide range extending communication capabilities for longer distance communication with the UAV.

Figure 4:
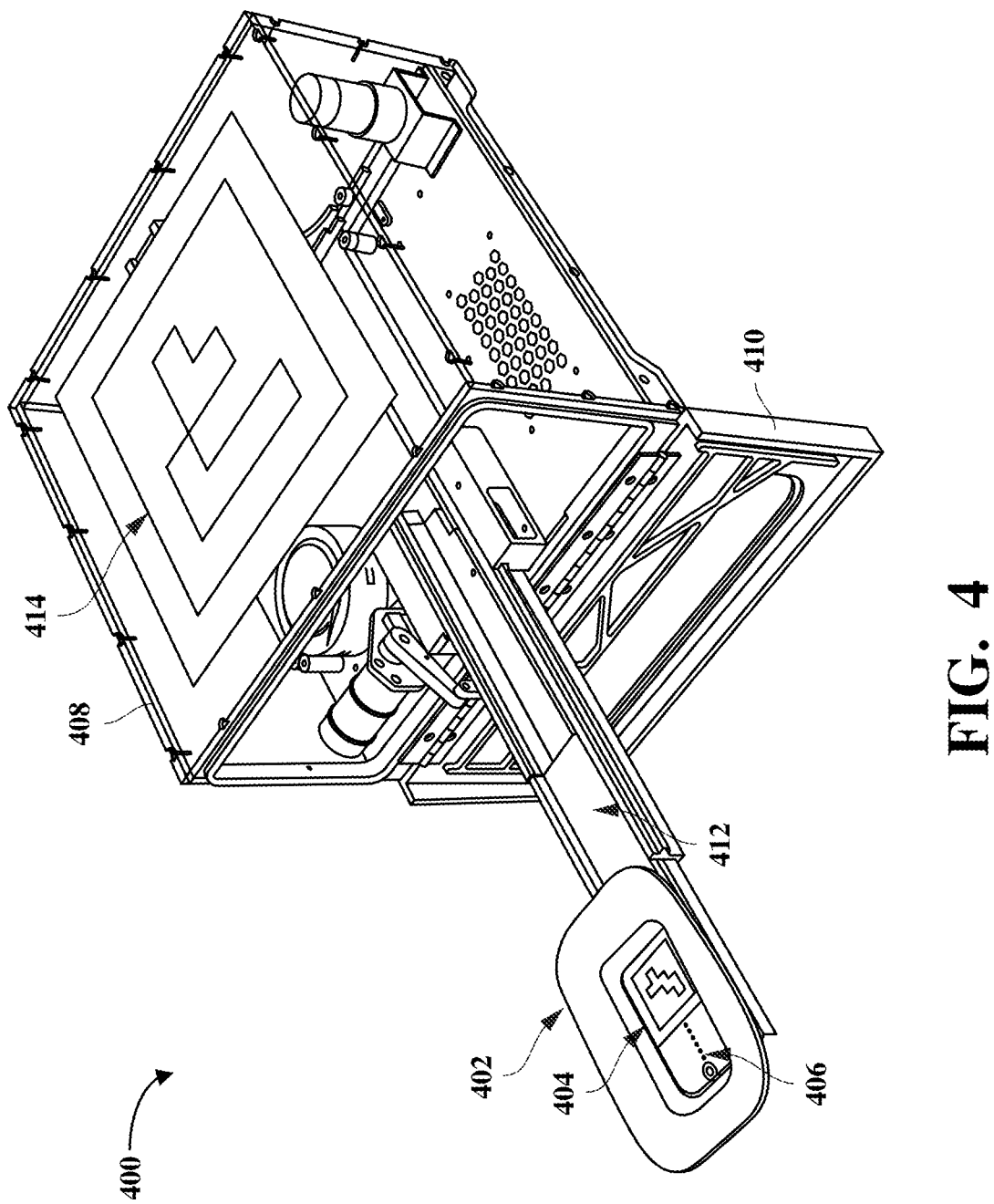
FIG. 4 is an illustration of an example of a dock for facilitating autonomous landing of a UAV.

FIG. 4 is an illustration of an example of a dock 400 for facilitating autonomous landing of a UAV, for example, the UAV 102 shown in FIG. 1. The dock 400 may, for example, be the dock 106 shown in FIG. 1. The dock 400 includes a cradle 402 (i.e., landing surface) with a fiducial 404, charging contacts 406 for a battery charger, a box 408 in the shape of a rectangular box with a door 410, and a retractable arm 412.

The cradle 402 is configured to hold a UAV. The UAV may be configured for autonomous landing on the cradle 402. The cradle 402 has a funnel geometry shaped to fit a bottom surface of the UAV at a base of the funnel. The tapered sides of the funnel may help to mechanically guide the bottom surface of the UAV into a centered position over the base of the funnel during a landing. For example, corners at the base of the funnel may serve to prevent the aerial vehicle from rotating on the cradle 402 after the bottom surface of the aerial vehicle has settled into the base of the funnel shape of the cradle 402. For example, the fiducial 404 may include an asymmetric pattern that enables robust detection and determination of a pose (i.e., a position and an orientation) of the fiducial 404 relative to the UAV based on an image of the fiducial 404, for example, captured with an image sensor of the UAV.

The conducting contacts 406 are contacts of a battery charger on the cradle 402, positioned at the bottom of the funnel. The dock 400 includes a charger configured to charge a battery of the UAV while the UAV is on the cradle 402. For example, a battery pack of the UAV (e.g., the battery pack 224 shown in FIG. 2B) may be shaped to fit on the cradle 402 at the bottom of the funnel shape. As the UAV makes its final approach to the cradle 402, the bottom of the battery pack will contact the cradle 402 and be mechanically guided by the tapered sides of the funnel to a centered location at the bottom of the funnel. When the landing is complete, the conducting contacts of the battery pack may come into contact with the conducting contacts 406 on the cradle 402, making electrical connections to enable charging of the battery of the UAV. The dock 400 may include a charger configured to charge the battery while the UAV is on the cradle 402.

The box 408 is configured to enclose the cradle 402 in a first arrangement and expose the cradle 402 in a second arrangement. The dock 400 may be configured to transition from the first arrangement to the second arrangement automatically by performing steps including opening the door 410 of the box 408 and extending the retractable arm 412 to move the cradle 402 from inside the box 408 to outside of the box 408.

The cradle 402 is positioned at an end of the retractable arm 412. When the retractable arm 412 is extended, the cradle 402 is positioned away from the box 408 of the dock 400, which may reduce or prevent propeller wash from the propellers of a UAV during a landing, thus simplifying the landing operation. The retractable arm 412 may include aerodynamic cowling for redirecting propeller wash to further mitigate the problems of propeller wash during landing. The retractable arm supports the cradle 402 and enables the cradle 402 to be positioned outside the box 408, to facilitate takeoff and landing of a UAV, or inside the box 408, for storage and/or servicing of a UAV.

In some implementations, the dock 400 includes a fiducial 414 on an outer surface of the box 408. The fiducial 404 and the fiducial 414 may be detected and used for visual localization of the UAV in relation the dock 400 to enable a precise landing on the cradle 402. For example, the fiducial 414 may encode data that, when processed, identifies the dock 400, and the fiducial 404 may encode data that, when processed, enables robust detection and determination of a pose (i.e., a position and an orientation) of the fiducial 414 relative to the UAV. The fiducial 414 may be referred to as a first fiducial and the fiducial 404 may be referred to as a second fiducial. The first fiducial may be larger than the second fiducial to facilitate visual localization from farther distances as a UAV approaches the dock 400. For example, the area of the first fiducial may be 25 times the area of the second fiducial.

The dock 400 is shown by example only and is non-limiting as to form and functionality. Thus, other implementations of the dock 400 are possible. For example, other implementations of the dock 400 may be similar or identical to the examples shown and described within U.S. patent application Ser. No. 17/889,991, filed Aug. 31, 2022, the entire disclosure of which is herein incorporated by reference.

Figure 5:
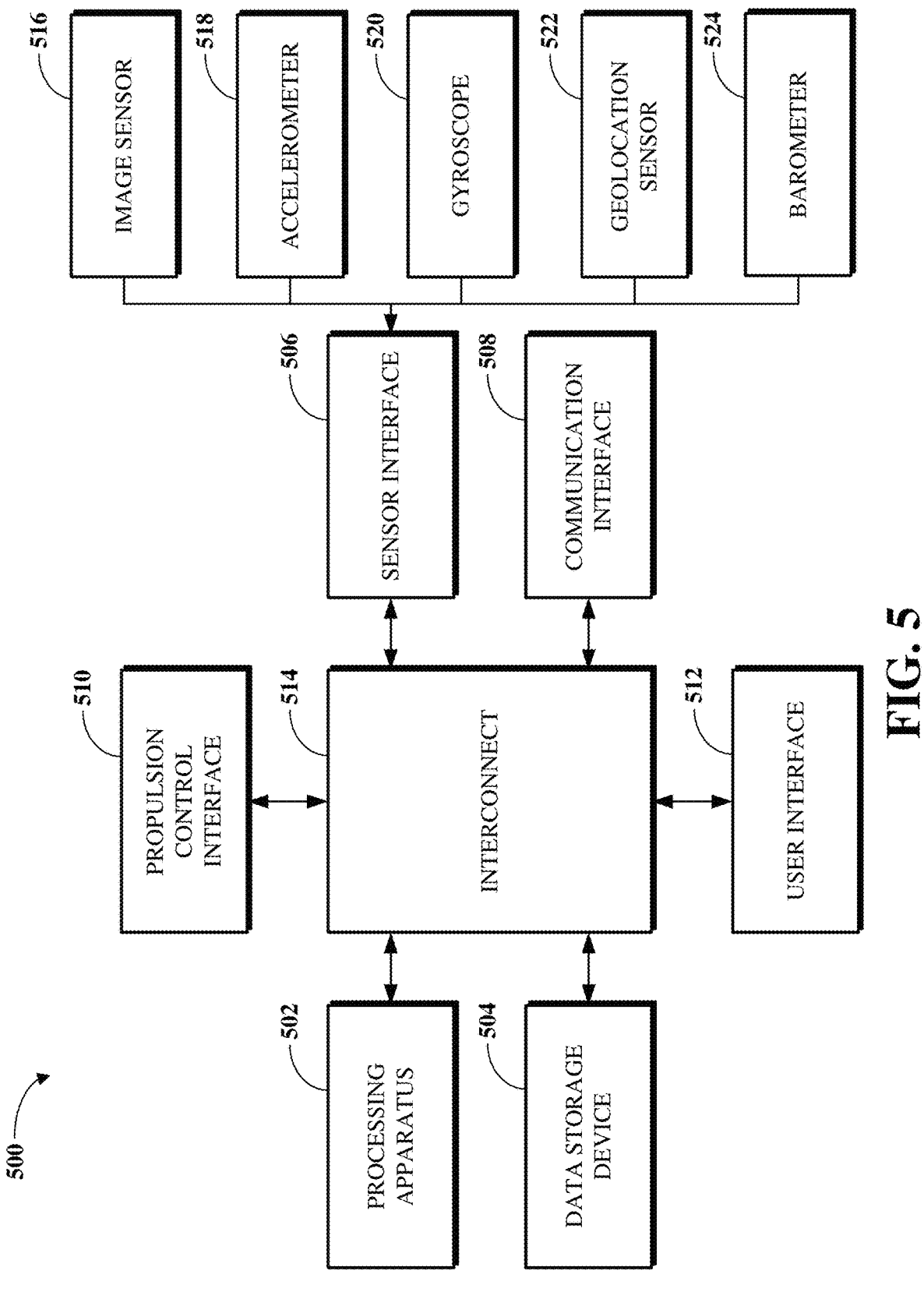
FIG. 5 is a block diagram of an example of a hardware configuration of a UAV.

FIG. 5 is a block diagram of an example of a hardware configuration of a UAV 500, which may, for example, be the UAV 102 shown in FIG. 1. The UAV 500 includes a processing apparatus 502, a data storage device 504, a sensor interface 506, a communications interface 508, propulsion control interface 510, a user interface 512, and an interconnect 514 through which the processing apparatus 502 may access the other components.

The processing apparatus 502 is operable to execute instructions that have been stored in the data storage device 504 or elsewhere. The processing apparatus 502 is a processor with random access memory (RAM) for temporarily storing instructions read from the data storage device 504 or elsewhere while the instructions are being executed. The processing apparatus 502 may include a single processor or multiple processors each having single or multiple processing cores. Alternatively, the processing apparatus 502 may include another type of device, or multiple devices, capable of manipulating or processing data. The processing apparatus 502 may be arranged into processing unit, such as a central processing unit (CPU) or a graphics processing unit (GPU).

The data storage device 504 is a non-volatile information storage device, for example, a solid-state drive, a read-only memory device (ROM), an optical disc, a magnetic disc, or another suitable type of storage device such as a non-transitory computer readable memory. The data storage device 504 may include another type of device, or multiple devices, capable of storing data for retrieval or processing by the processing apparatus 502. The processing apparatus 502 may access and manipulate data stored in the data storage device 504 via the interconnect 514, which may, for example, be a bus or a wired or wireless network (e.g., a vehicle area network).

The sensor interface 506 is configured to control and/or receive data from one or more sensors of the UAV 500. The data may refer, for example, to one or more of temperature measurements, pressure measurements, a global positioning system (GPS) data, acceleration measurements, angular rate measurements, magnetic flux measurements, a visible spectrum image, an infrared image, an image including infrared data and visible spectrum data, and/or other sensor output. For example, the one or more sensors from which the data is generated may include single or multiple of one or more of an image sensor 516, an accelerometer 518, a gyroscope 520, a geolocation sensor 522, a barometer 524, and/or another sensor. In some implementations, the accelerometer 518 and the gyroscope 520 may be combined as an inertial measurement unit (IMU). In some implementations, the sensor interface 506 may implement a serial port protocol (e.g., inter-integrated circuit (I2C) or serial peripheral interface (SPI)) for communications with one or more sensor devices over conductors. In some implementations, the sensor interface 506 may include a wireless interface for communicating with one or more sensor groups via low-power, short-range communications techniques (e.g., using a vehicle area network protocol).

The communications interface 508 facilitates communication with one or more other devices, for example, a paired dock (e.g., the dock 106), a controller (e.g., the controller 104), or another device, for example, a user computing device (e.g., a smartphone, tablet, or other device). The communications interface 508 may include a wireless interface and/or a wired interface. For example, the wireless interface may facilitate communication via a Wi-Fi network, a Bluetooth link, a ZigBee link, or another network or link. In another example, the wired interface may facilitate communication via a serial port (e.g., RS-232 or universal serial bus (USB)). The communications interface 508 further facilitates communication via a network, which may, for example, be the Internet, a local area network, a wide area network, or another public or private network.

The propulsion control interface 510 is used by the processing apparatus to control a propulsion system of the UAV 500 (e.g., including one or more propellers driven by electric motors). For example, the propulsion control interface 510 may include circuitry for converting digital control signals from the processing apparatus 502 to analog control signals for actuators (e.g., electric motors driving respective propellers). In some implementations, the propulsion control interface 510 may implement a serial port protocol (e.g., I2C or SPI) for communications with the processing apparatus 502. In some implementations, the propulsion control interface 510 may include a wireless interface for communicating with one or more motors via low-power, short-range communications (e.g., a vehicle area network protocol).

The user interface 512 allows input and output of information from/to a user. In some implementations, the user interface 512 can include a display, which can be a liquid crystal display (LCD), a light emitting diode (LED) display (e.g., an organic light-emitting diode (OLED) display), or another suitable display. In some such implementations, the user interface 512 may be or include a touchscreen. In some implementations, the user interface 512 may include one or more buttons. In some implementations, the user interface 512 may include a positional input device, such as a touchpad, touchscreen, or the like, or another suitable human or machine interface device.

In some implementations, the UAV 500 may include one or more additional components not shown in FIG. 5. In some implementations, one or more components shown in FIG. 5 may be omitted from the UAV 500, for example, the user interface 512.

Figure 6:
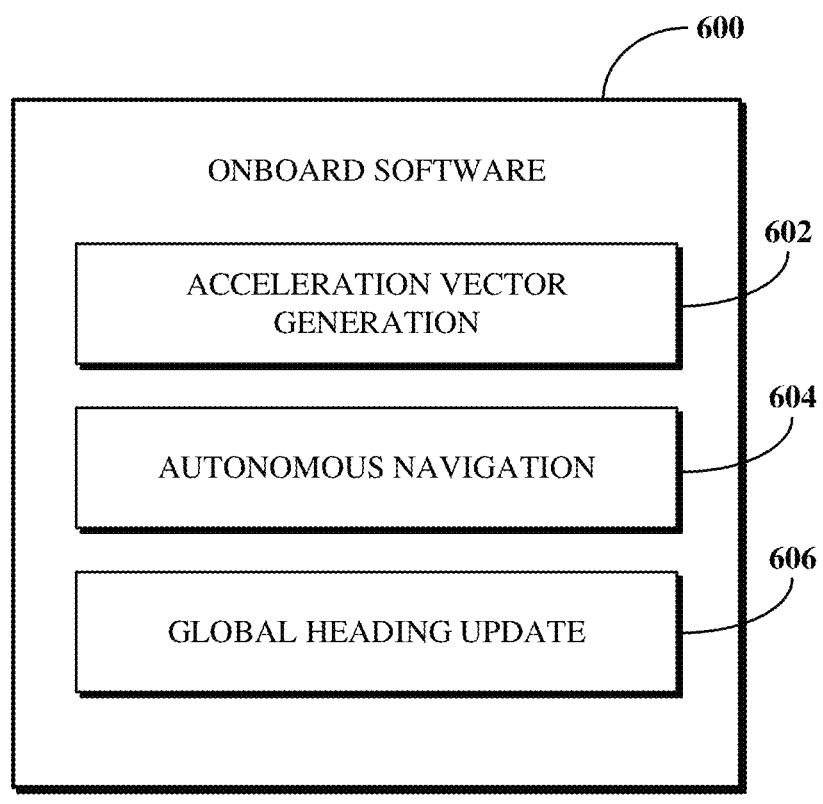
FIG. 6 is a block diagram of example software functionality of a UAV system.

FIG. 6 is a block diagram of example software functionality of a UAV system, which may, for example, be the system 100 shown in FIG. 1. In particular, the software functionality is represented as onboard software 600 running at a UAV, for example, the UAV 102 shown in FIG. 1. The onboard software 600 includes an acceleration vector generation tool 602, an autonomous navigation tool 604, and a global heading update tool 606.

The acceleration vector generation tool 602 configures the UAV for motion-based calibration. The acceleration vector generation tool 602 configures the UAV to obtain acceleration signals from one or more accelerometers and obtain angular rate signals from one or more gyroscopes. The acceleration vector generation tool 602 configures the UAV to fuse the one or more accelerometers and one or more gyroscopes in a complementary filter. The acceleration vector generation tool 602 configures the complementary filter to obtain and combine the acceleration signals and angular rate signals into a combined signal for output.

The acceleration vector generation tool 602 configures the UAV to estimate an orientation of the UAV body. The estimation of the orientation of the UAV body may be based on the combined signals output from the complementary filter. The acceleration vector generation tool 602 configures the UAV to compute a first acceleration vector in a navigation frame of reference, for example, based on the estimated orientation of the UAV body. The acceleration vector generation tool 602 configures the UAV to determine the global velocity from the GPS signal. The acceleration vector generation tool 608 configures the UAV to compute a second acceleration vector in the GPS frame of reference.

The autonomous navigation tool 604 includes functionality for enabling autonomous flight of the UAV. Autonomous flight functionality of the UAV generally includes switching between the use of cameras for vision-based navigation and the use of a GPS and an IMU onboard the UAV for position-based navigation. In particular, autonomous flight of the UAV may use position-based navigation where objects within an environment in which the UAV is operating are determined to be at least some distance away from the UAV, and autonomous flight of the UAV may instead use vision-based navigation where those objects are determined to be less than that distance away from the UAV.

With position-based navigation, the UAV may receive a series of location signals through a GPS receiver. The received GPS signals may be indicative of locations of the UAV within a world frame of reference. The UAV may use the location signals from the GPS receiver to determine a location and velocity of the UAV. The UAV may determine an acceleration signal and an orientation signal within a navigation frame of reference based on acceleration signals from one or more accelerometers and angular rate signals from one or more gyroscopes, such as which may be associated with the IMU onboard the UAV.

With vision-based navigation, one or more onboard cameras of the UAV may continuously or otherwise periodically collect data usable to generate images. The image may be processed in real-time or substantially in real-time to identify objects within the environment in which the UAV is operated and to determine a relative position of the UAV with respect to those objects. Depth estimation may be performed to determine the relative position of the UAV with respect to an object. Performing depth estimation includes modeling depth values for various pixels of the images generated based on the data collected using the onboard cameras. A depth value may, for example, be modeled according to red green blue (RGB) inputs collected for a subject pixel. Based on those depth values and output from the onboard IMU, the trajectory of the UAV toward a detected object may be evaluated to enable the UAV to avoid object collision.

The global heading update tool 606 includes functionality related to the estimating and updating of the UAV heading. The global heading update tool 606 configures the UAV to estimate the UAV heading by running a histogram filter. The histogram filter may be run recursively by aligning the first acceleration vector and the second acceleration vector. The global heading update tool 606 may configure the histogram filter to provide an uncertainty value to determine whether the motion-based calibration procedure has completed.

The global heading update tool 606 configures the UAV to obtain a time window of acceleration from the first acceleration vector and the second acceleration vector. The global heading update tool 606 configures the UAV to perform a batch optimization, for example, to refine the UAV heading estimate. The global heading update tool 606 may configure the UAV to account for a time delay between the IMU and GPS signals to improve the UAV heading estimate. The global heading update tool 606 configures the UAV to update the UAV heading estimate and calibrate the UAV based on the UAV heading estimate.

Figure 7:
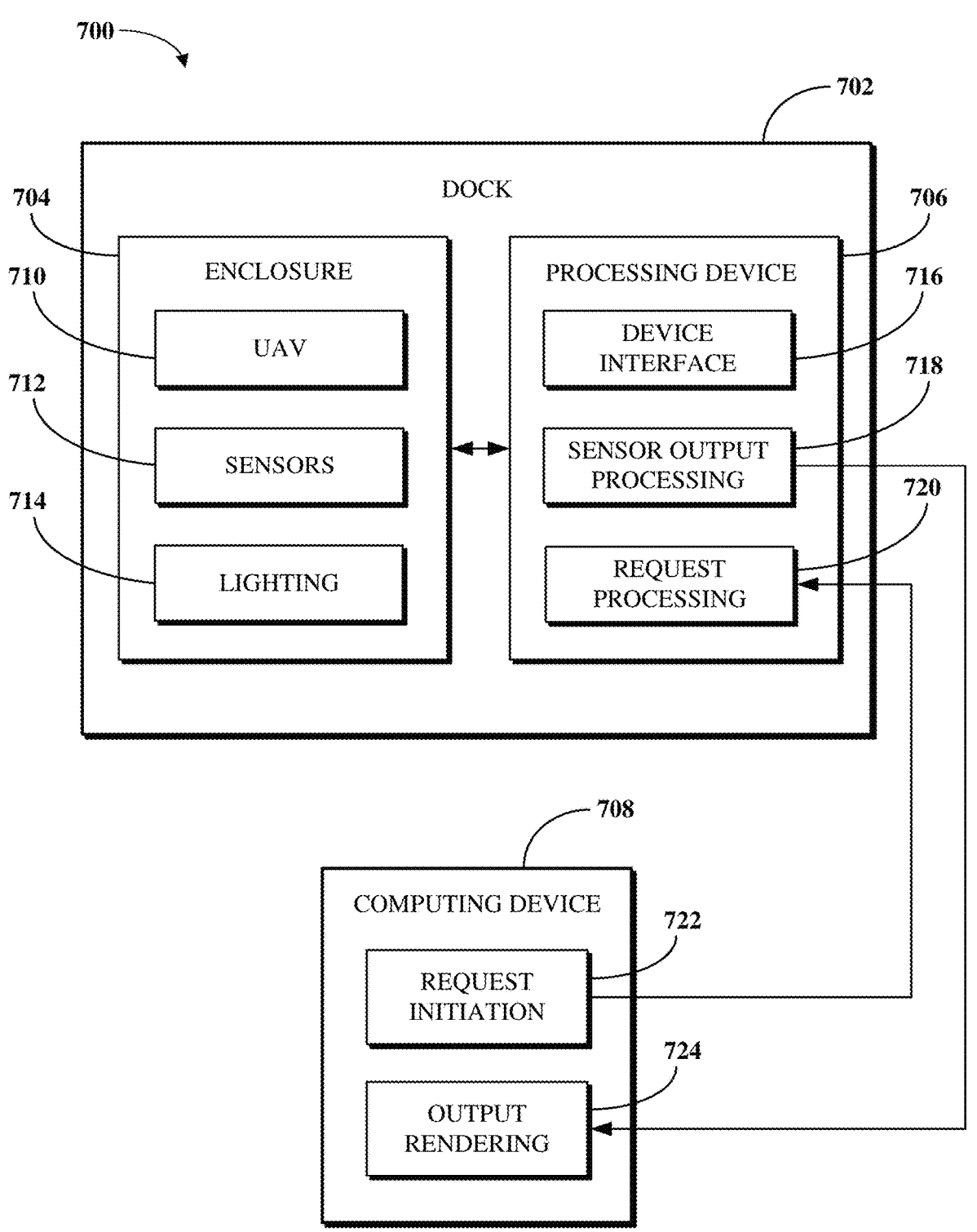
FIG. 7 is a block diagram of an example of an automated UAV dock operation system.

FIG. 7 is a block diagram of an example of an automated UAV dock operation system 700. The system includes a dock 702, which may, for example, be the dock 106 shown in FIG. 1 or the dock 400 shown in FIG. 4. The dock 702 includes an enclosure 704 and a processing device 706. The enclosure 704 is a portion of the dock 400 configured to receive a UAV, and thus within or upon which a UAV may be located while docked. For example, the enclosure 704 may include sides that surround a UAV while docked and may include a door that can close to protect the UAV while docked. The processing device 706 is a computing device configured to operate aspects of the dock 702, as will be described below, and to communicate with one or more other computing devices external to the dock 702, such as a computing device 708, which may be a user device (e.g., the controller 104 shown in FIG. 1 or the controller 300 shown in FIG. 3) or a server device (e.g., the server 108 shown in FIG. 1).

The enclosure 704 includes a UAV 710, sensors 712, and lighting 714. The enclosure 704 may be configured such that the UAV 710 may dock (e.g., sit, land, be at rest) on a cradle within the enclosure 704. The UAV 710 may, for example, be the UAV 102 shown in FIG. 1 or the UAV 200 shown in FIG. 2. The sensors 712 are of one or more types and are accessible for use by the dock 702. For example, the sensors 712 may include sensors housed within the enclosure 704, sensors mounted on an exterior of the enclosure 704, sensors of the UAV 710, or a combination thereof. The sensors 712 may, for example, be cameras, color sensors, light sensors, smoke sensors, touch sensors, ultrasonic sensors, temperature sensors, or the like. For example, the sensors 712 may include one or more cameras mounted within the enclosure 704 to view the UAV 710 while the UAV 710 is docked with the enclosure. In another example, the sensors 712 may include a temperature sensor within the enclosure 704 to detect fluctuations in the temperature that may indicate an electrical malfunction within the dock 702 or the UAV 710. In a further example, the sensors 712 may include a light sensor mounted on the exterior of the enclosure 704. The light sensor may be able to detect whether it is day or night or, alternatively, the lights sensor may be able to determine the lighting conditions around the dock 702.

The lighting 714 includes one or more light sources (e.g., LEDs) configured to illuminate all or a portion of the enclosure 704 and or an area proximate to the enclosure 704. The lighting 714 may be housed within the enclosure, mounted to the exterior of the enclosure 704 or a combination thereof. The lighting 714 may be used to properly illuminate the UAV 710 during a pre-flight inspection, to illuminate the area surrounding the dock 702, or to illuminate the dock 702. For example, the lighting 714 may be used to illuminate the UAV 710 such that a camera of the sensors 712 may be able to detect a broken propeller or damage to a frame of the UAV 710. In another example, the lighting 714 may be used to illuminate the dock 702 such that the UAV 710, when later autonomously returning to the dock 702 after flight, will be able to locate the dock 702. The lighting 714 may, for example, be enabled (i.e., turned on to illuminate some or all of the enclosure 704 and/or an area proximate thereto) as part of the pre-flight inspection of the UAV 710 and disabled (i.e., turned off) upon a completion or cancellation of the pre-flight inspection of the UAV 710. In some cases, some or all of the lighting 714 may be selectively enabled and disabled according to conditions of the UAV 710. For example, the lighting 714 on either side of a door of the dock 702 may be enabled based on one or more arms of the UAV 710 being in an extended position.

The processing device 706 is operable to execute instructions that have been stored in memory of one or more devices. The processing device 706 includes a processor with random access memory (RAM) for temporarily storing instructions while the instructions are being executed. For example, the processing device 706 may be an integrated circuit, such as an application-specific integrated circuit (ASIC). The processing device 706 may include a single processor or multiple processors each having single or multiple processing cores. Alternatively, the processing device 706 may include another type of device, or multiple devices, capable of manipulating or processing data. The processing device 706 may be arranged into processing units, such as a CPU or a GPU.

The processing device 706 includes a device interface 716, sensor output processing software 718, and request processing software 720. The processing device 706 includes a device interface 716. The device interface 716 may be used to facilitate communications between the processing device 706 and one or more other aspects, for example, of the enclosure 704, namely, the UAV 710, the sensors 712, and/or the lighting 714. For example, the device interface 716 may include circuitry for converting digital control signals from the processing device 706 to analog control signals for actuators (e.g., electric motors driving respective propellers). In another example, the device interface 716 may include circuitry for receiving image data from a camera mounted on the interior of the enclosure 704.

The sensor output processing software 718 may be used to receive sensor data received via the device interface 716. The received data may come from the sensors 712, from the sensors attached to the UAV 710, or a combination thereof. The sensor output processing software 718 may analyze, format, or prepare the sensor data before transmitting the sensor data to the computing device 708. For example, the sensor output processing software 718 may receive sensor data from a camera mounted within the enclosure 704. The camera may transmit image data of the UAV 710. The sensor output processing software 718 may crop the image to only show the relevant portions of the propeller blades. Alternatively, the sensor output processing software 718 may receive temperature data from a temperature sensor located within the enclosure 704. The temperature data may be converted from Celsius to Fahrenheit before being sent to the output rendering software 724.

The request processing software 720 may be used to receive requests from the computing device 708. The request processing software 720 handles all incoming requests to the processing device 706. The request processing software 720 may receive requests from the request initiation software 722. For example, the request processing software 720 may receive a request to perform a pre-flight inspection of the UAV 710, initiated at the computing device 708.

The computing device 708 includes request initiation software 722 and output rendering software 724. The request initiation software 722 may be used to initiate a request from the computing device 708 to the processing device 706. The request initiation software 722 may initiate the request by sending the request to the request processing software 720.

For example, the computing device 708 may initiate a request to turn on the lights mounted on the exterior of the enclosure 704.

The output rendering software 724 may be used to format and render the output received from the sensor output processing software 718. For example, the sensor output processing software 718 may output the details and diagnostic information from one or more sensors of the dock 702 or the UAV 710 during a pre-flight inspection. The data may, for example, be in a raw (e.g., unformatted) state. The output rendering software 724 may accordingly aggregate or otherwise process the output received from the sensor output processing software 718 and format the data such that the output rendered is in a human readable format (e.g., hypertext markup language (HTML), portable document format (PDF), or the like).

Figure 8:
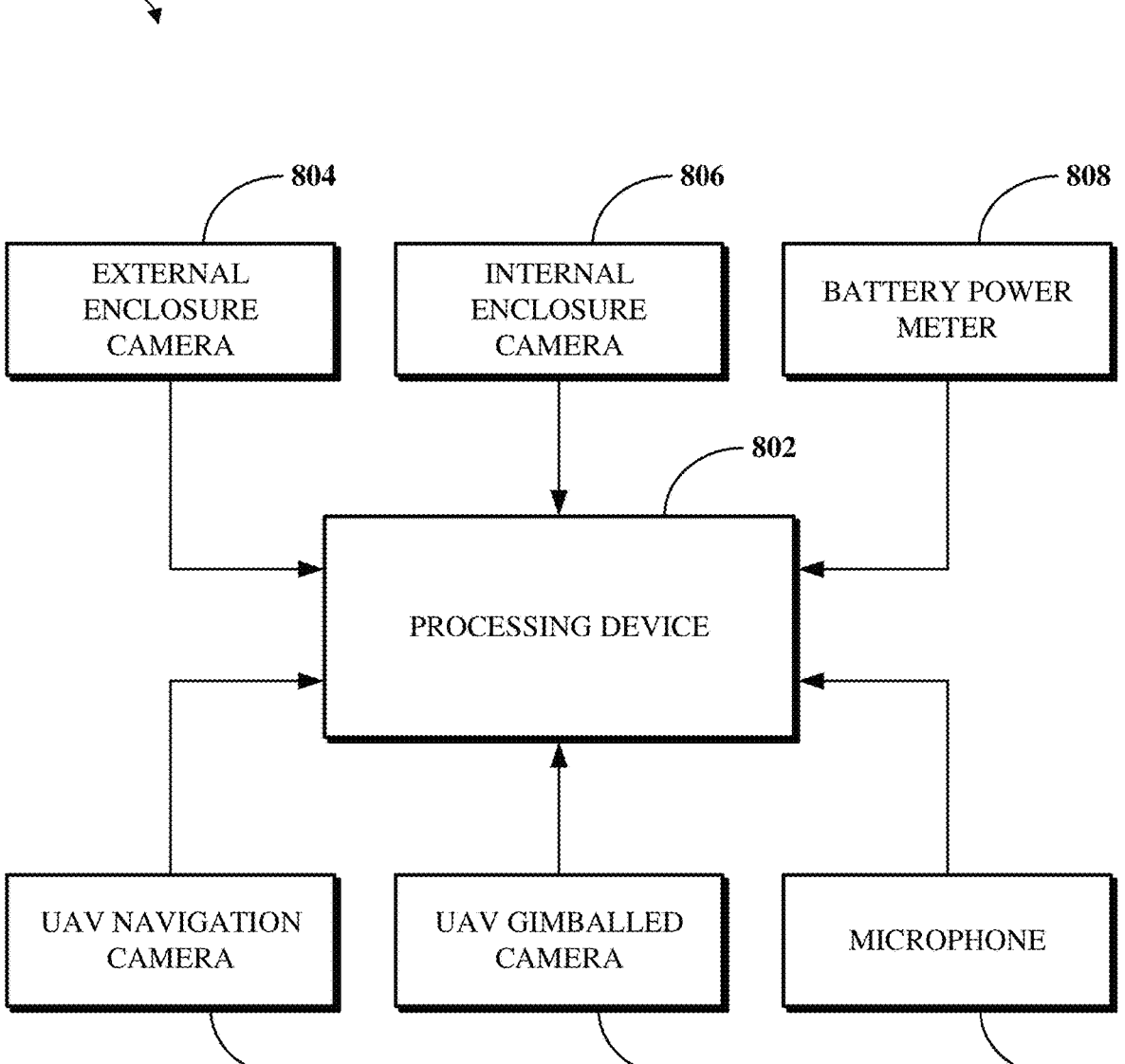
FIG. 8 is a block diagram of an example configuration of sensors accessible by a dock for a pre-flight UAV inspection.

FIG. 8 is a block diagram of an example configuration 800 of sensors accessible by a dock for a pre-flight UAV inspection, for example, the dock 702 shown in FIG. 7. In the example shown, the configuration 800 includes a processing device 802 (e.g., the processing device 706 shown in FIG. 7) and sensors both of the dock and of the UAV to be inspected, such as an external enclosure camera 804, an internal enclosure camera 806, a battery power meter 808, a UAV navigation camera 810, a UAV gimballed camera 812, and a microphone 814. The sensors 804 through 814, which may thus be the sensors 712 shown in FIG. 7), are accordingly illustrated by example, and other implementations, combinations, and the like may be used.

The external enclosure camera 804 is a camera external to an enclosure of the dock (e.g., the enclosure 704 shown in FIG. 7). The external enclosure camera 804 may be configured such that a UAV (e.g., the UAV 710 shown in FIG. 7) is partially or wholly visible within the field of view of the camera 804 while the UAV is docked on the cradle of an enclosure of the dock and the cradle is partially or fully extended out of the enclosure, such that the UAV is no longer entirely enclosed within the enclosure. Alternatively, the external enclosure camera 804 may be configured such that an area surrounding the dock is visible within the field of view of the external enclosure camera 804. In some embodiments, the external enclosure camera 804 may be more than one camera, and more than one configuration may be used simultaneously. The external enclosure camera 804 may be configured to communicate with the processing device 802 via a device interface (e.g., the device interface 716 shown in FIG. 7). For example, as part of a pre-flight inspection, the enclosure may need to capture an image of the UAV docked with in the cradle outside of the dock to inspect the propeller blades for damage. At the same time, the dock may need to inspect the area surrounding the dock to ensure that it is clear of debris or obstacles and that the immediate flight path of the UAV is safe for flight.

The internal enclosure camera 806 is a camera that is internal to the enclosure of the dock and thus has a field of view including some or all of the interior of the enclosure. The internal enclosure camera 806 may be configured such that a top-down, bottom-up or side view of the UAV is visible within the field of view of the internal enclosure camera 806 when the UAV is docked within the enclosure. In some implementations, the internal enclosure camera 806 may be more than one camera such that more than one view (e.g., top-down, bottom-up, starboard side, port side) of the UAV may be visible. The internal enclosure camera 806 may be configured to communicate with the processing device 802 via a device interface (e.g., the device interface 716 shown in FIG. 7). For example, during a pre-flight inspection, the dock may visually inspect the top and/or bottom of the UAV frame (e.g., the body, one or more arms, and/or one or more propellers of the UAV) using the internal enclosure camera 806. In such a case, two internal enclosure cameras would be utilized to show both a top-down and a bottom-up view of the UAV.

The battery power meter 808 is a sensor configured to determine (e.g., measure) the current level of charge of the battery located within the UAV. The battery power meter 808 may be connected to the charging contacts 406 shown in FIG. 4. As such the battery power meter 808 can be used to ensure that the battery located within the UAV (e.g., the battery pack 224 shown in FIG. 2B) is properly charging and what level of charge the battery is currently holding. The battery power meter 808 may be configured to communicate with the processing device 802 via a device interface (e.g., the device interface 716 shown in FIG. 7). For example, during a pre-flight inspection, the battery power meter 808 may determine that the battery is currently holding 10% of its charge. As such, the pre-flight inspection may show a failed state for the UAV battery, rendering the UAV unsafe for flight.

The UAV navigation camera 810 is a camera of the UAV that is used in connection with navigation and flight operations of the UAV. The UAV navigation camera 810 may be one or more cameras. The UAV navigation camera 810 may, for example, be or otherwise include one or more of the image sensors 216, 218, and 220 shown in FIGS. 2A-B. The UAV navigation camera 810 may, for example, be used for autonomous vision-based navigation such as autonomously landing the UAV on the cradle of the dock. The UAV navigation camera 810 may be configured to communicate with the processing device 802 via a device interface (e.g., the device interface 716 shown in FIG. 7). The UAV navigation camera 810 can provide output indicative of an obscuration of the lens thereof. For example, if the lens appears clear, such as based on the lack of artifacts within an image captured thereby or the presence of artifacts failing to meet a threshold, the UAV navigation camera 810 may accordingly be determined as being in an operational state suitable for use.

The UAV gimballed camera 812 is a camera of the UAV that is used for visual media capture. The UAV gimballed camera 812 may, for example, be or otherwise include the image sensor 204 shown in FIG. 2A. The UAV gimballed camera 812 may be used to provide a RPIC, via their controller or other user device, with a live stream of the surrounding area of the UAV while piloting the UAV or to otherwise capture image and/or video media during an operation of the UAV. The UAV gimballed camera 812 may be configured to communicate with the processing device 802 via a device interface (e.g., the device interface 716 shown in FIG. 7). The UAV gimballed camera 812 can provide output indicative of an obscuration of the lens thereof. For example, if the lens appears clear, such as based on the lack of artifacts within an image captured thereby or the presence of artifacts failing to meet a threshold, the UAV gimballed camera 812 may accordingly be determined as being in an operational state suitable for use.

The microphone 814 is a sensor used for audio capture. The microphone 814 may be located on an external surface of the dock, and internal surface of the dock, the UAV, or elsewhere. The microphone 814 may, for example, be used to record or listen to the sound of the UAV during a pre-flight inspection. The microphone 814 may be configured to communicate with the processing device 802 via a device interface (e.g., the device interface 716 shown in FIG. 7).

For example, audio captured using the microphone 814 can be processed to determine the presence of undesirable sounds during a test of a propulsion system of the UAV. In another example, during a pre-flight inspection the microphone 814 may be used to enable the dock to record and analyze (i.e., listen to) the waveform produced by the UAV during as systems check. The pre-flight inspection may detect anomalies in the waveform produced. In either case, the pre-flight inspection may indicate that the UAV is not suitable for aerial flight.

Figure 9:
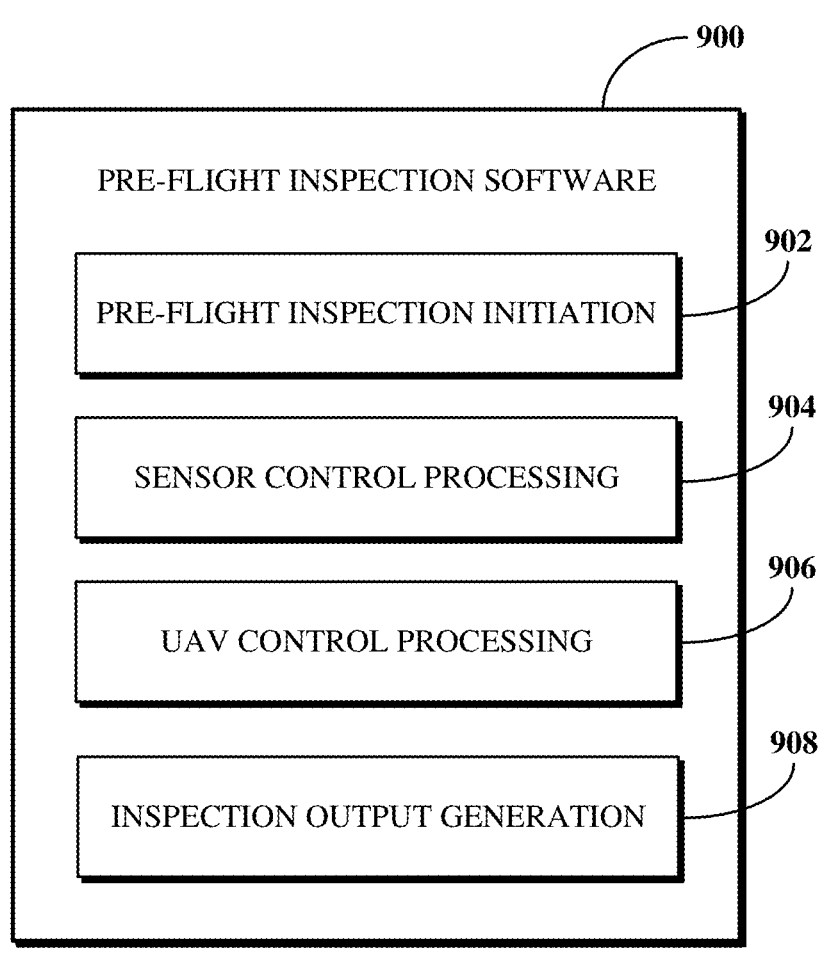
FIG. 9 is a block diagram of example functionality of pre-flight inspection software.

FIG. 9 is a block diagram of example functionality of pre-flight inspection software 900. The pre-flight inspection software 900 is configured to autonomously perform a pre-flight inspection for a UAV, for example, before a RPIC is given control to pilot the UAV. In particular, the pre-flight inspection software may use data from sensors accessible to a dock at which the UAV is located before its flight begins (e.g., the sensors 712 shown in FIG. 7). The pre-flight inspection software 900 is executed or otherwise run at the dock (e.g., the dock 702 shown in FIG. 7), for example, using a processing device (e.g., the processing device 704 shown in FIG. 7). The pre-flight inspection software 900 includes a pre-flight inspection initiation tool 902, a sensor control processing tool 904, a UAV control processing tool 906, and an inspection output generation tool 908. The tools 902 through 908 represent various functionality of the pre-flight inspection software 900 and are non-limiting as to a particular structure or other expression of code, script, or the like.

The pre-flight inspection initiation tool 902 receives a request to perform a pre-flight UAV inspection. The request includes data usable by the pre-flight inspection initiation tool 902 to initiate the performance of a pre-flight inspection. For example, the tool 902 may receive the request via the request processing software 720 shown in FIG. 7, via another device configured to provide manually or automatically initiated requests, or from the processing device which executes the pre-flight inspection software 900. The request may be obtained on a periodic basis or event basis. For example, the request may be obtained on a periodic basis where the request is scheduled to cause repeat pre-flight inspections on some time basis, for example, daily, weekly, or monthly. In another example, the request may be obtained on an event basis where the request is obtained based on some triggering event, such as an initiation of the request at a computing device. In some cases, the pre-flight inspection initiation tool 902 may perform the operations required to prepare the UAV for inspection. For example, where the pre-flight inspection is performed with the UAV outside of an enclosure of the dock, the pre-flight inspection initiation tool 902 may instruct the dock to open a door for the enclosure. The pre-flight inspection initiation tool 902 may then instruct the dock to extend the cradle (e.g., the cradle 402 shown in FIG. 4) out of the enclosure, thus extending the UAV that is docked on the cradle outside of the enclosure. In another example, where the pre-flight inspection is performed while the UAV remains entirely within the dock, the pre-flight inspection initiation tool 902 may instruct the dock to open or close the door of the dock, as desired based, for example, on whether sensors external to the enclosure in which the UAV is located are to be used for the pre-flight inspection.

The sensor control processing tool 904 activates one or more sensors accessible to the dock to cause those one or more sensors to capture data indicative of operational states of the UAV during the pre-flight inspection. The sensors may, for example, be the sensors 712 shown in FIG. 7. The sensor control processing tool 904 may request diagnostic data from one or more sensors. For example, during a pre-flight inspection, the pre-flight inspection software 900 may need to activate a camera of the enclosure (e.g., the external enclosure camera 804 shown in FIG. 8). The pre-flight inspection software 900 may activate the camera using the sensor control processing tool 904. Furthermore, the pre-flight inspection software 900 may activate different sensors of the UAV (e.g., the gyroscope 520 shown in FIG. 5) which are not used to capture operational state data, to retrieve diagnostic data relating to the functionality of those sensors.

The UAV control processing tool 906 may activate one or more components and/or sub-systems of the UAV to test the functionality thereof or otherwise to evaluate damage or other undesirable conditions. Examples of such components include, without limitation, cameras and propellers. Examples of such sub-systems include, without limitation, a propulsion system, an electrical system, a vision system, a navigation system, a command and control system, or a battery system. The pre-flight inspection software 900 may, for example, request that the UAV control processing tool 906 activate the propulsion system (i.e., via the propulsion control interface 510 shown in FIG. 5) of the UAV. For example, the pre-flight inspection software 900 may check that the propulsion system is properly responding and activating as part of the pre-flight inspection. The UAV control processing tool 906 may accordingly activate some or all of the propulsion system, for example, motors of the propellers, to measure the performance thereof. Similar tests may be performed for other components and sub-systems.

The inspection output generation tool 908 produces output representing the operational states of the various UAV components and sub-systems inspected during the pre-flight inspection and transmits that output for storage (e.g., at a server device, such as the server 108 shown in FIG. 1) and/or display (e.g., at a user device associated with the UAV, such as the controller 104 shown in FIG. 1). For example, the output may include a formatted report detailing the outcome of the pre-flight inspection. The formatted report may be produced in one of a variety of formats, for example, as a PDF, a spreadsheet, a comma separated value (CSV) set, an HTML file, or the like. In some cases, the inspection output generation 908 may cause the processing device at the dock to locally save the report. In some cases, the inspection output generation tool 908 may obtain a video stream captured using a camera as one of the sensors activated by the sensor control processing tool 904 and transmit the video stream, in real-time or substantially in real-time, for storage and/or display. For example, the inspection output generation tool 908 can transmit a video stream captured using a navigation or gimballed camera of the UAV or using an internal or external enclosure camera of the dock to a user device of an RPIC to allow the RPIC to view the video stream during the pre-flight inspection. Transmitting the video stream may accordingly enable the RPIC to monitor the pre-flight inspection in real-time or substantially in real-time. In some cases, multiple video streams, each captured using a different camera, may be obtained and transmitted as described above.

In some implementations, the pre-flight inspection software 900 may interface with frontend user software running at a user device or other controller associated with the UAV. For example, the frontend user software may be implemented via client application, web application, website, or the like. The frontend user software includes one or more user interfaces enabling various functionality for and/or control over some or all of the pre-flight inspection. For example, via the one or more user interfaces, the RPIC or another user of the frontend user software may: automatically change exposure control information, such as to a pre-flight inspection default auto exposure based on a weight of the UAV, manually change exposure control information or gain information (e.g., mechanized using a brightness slider); indicate to prioritize a high resolution for a video stream of the pre-flight inspection and/or define a minimum resolution requirement for such a video stream; enable a logging of such a video stream; enable or disable some or all of the lighting of the enclosure, such as to switch the lighting to maximum brightness during the pre-flight inspection or to manually dim the lighting to aid in visibility and avoid washout; control a position of a slider within or beyond the enclosure of the dock to cause the UAV to move forward or backward, such as to alter the lighting angle and optimize the view angle for various components of the UAV (e.g., to help illuminate the front propellers and then the rear propellers according to static locations of the dock lighting); automatically adjust positions of the front and/or rear arms of the UAV; adjust a speed or otherwise select a speed for propeller rotation during a motor spin control test and cause the propellers to flick outwardly to unfold for camera visibility and lighting angle change purposes (e.g. with independent control over front and rear propellers); view and adjust arm angles and lever positions; view and interact with pre-flight checklists associated with the pre-flight inspection; view fault data associated with historical flights and/or historical pre-flight inspections to identify relevant components and/or sub-systems for increased scrutiny during the current pre-flight inspection; and use one or more cameras (e.g., of the dock or UAV) to digitally zoom into one or more portions of the UAV during the pre-flight inspection. In some such implementations, where the RPIC identifies, within the pre-flight inspection, a reason to discontinue flight operations, the RPIC may indicate this within the one or more user interfaces to cause the UAV and dock to return to a previous state. In some such implementations, these features may remain available regardless of an immediate or pending flight plan for the UAV. In some such implementations, information indicating time spent conducting the inspection may be logged or otherwise reported via the one or more user interfaces.

In some implementations, the same or other user interfaces may be used to view video streams captured for the UAV, for example, using one or more cameras of the dock and/or of the UAV at various times. For example, a first video stream may be transmitted for rendering at the user device to provide a real-time or substantially real-time video of the UAV during a launch operation following the pre-flight inspection. In another example, a second video stream may be transmitted for rendering at the user device to provide a real-time or substantially real-time video of the UAV during a subsequent landing operation. In yet another example, one or more video streams may be transmitted for rendering at the user device to enable inspections of the conditions and/or status of the UAV during and/or after anomalous landing events.

In one non-limiting example user flow for a pre-flight inspection, an RPIC accesses the frontend software enabled for their organization. The RPIC identifies the UAV to use for a flight and indicates the intended flight within a user interface. A video stream captured using a dock camera is rendered for display at a user device of the RPIC and the dock door opens. The RPIC causes a pre-flight inspection of the UAV to begin. Output of the pre-flight inspection is provided via a checklist format output at the user device and the RPIC indicates to manually inspect portions of the UAV. The UAV is extended beyond the dock to a distance such that the drone becomes inspectable via a dock camera. The RPIC inspects the drone to their satisfaction and indicates to proceed with the flight within a user interface. An arm of the UAV extends to a takeoff distance. The drone launches and a video stream captured using a camera of the drone is transmitted for rendering at the user device. The UAV flies to the completion of the mission, with the dock camera video stream rendered in a side-by-side view or picture-in-picture view alongside the UAV video stream. The RPIC views the video streams to ensure the area proximate to the dock is clear for the UAV to perform a landing operation. The RPIC indicates to return the UAV to the dock within a user interface. The UAV accordingly performs a landing operation to return to the dock, including finding the dock and descending toward a cradle of the dock. The user observes the UAV land and indicates to perform a post-flight inspection via a user interface. The post-flight inspection is performed including with the UAV arms retracting to an inspection length and the UAV retracting within the slider of the dock. The UAV and dock are then returned to their resting states. In some cases, one or more of the video streams may be broadcast (e.g., to the user device and/or to one or more other computing devices) based on a subscriber status associated therewith. In some cases, one or more of the video streams may be rectified. In some cases, organizational or subscriber settings may be usable to control the automated recording and storage of camera video streams, for example, pre-flight, for launch, and/or for landing. In some cases, a user interface may enable the RPIC to indicate to leave one or more dock cameras on with a video stream persistently captured thereby for security purposes.

Figure 10:
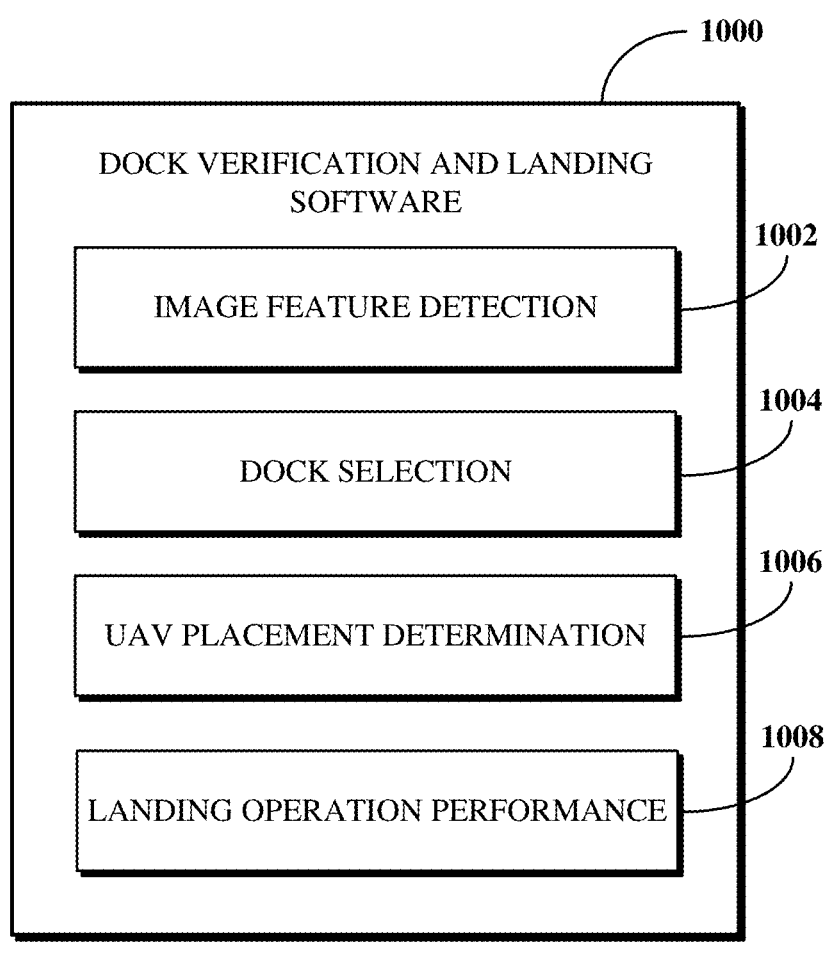
FIG. 10 is a block diagram of example functionality of dock verification and landing software.

FIG. 10 is a block diagram of example functionality of dock verification and landing software 1000. The dock return software 1000 is executed or otherwise run at a UAV (e.g., the UAV 200 shown in FIGS. 2A-B). In particular, the dock return software 1000 is wholly or partially executed or otherwise run while the UAV is in flight within an operating environment. The dock return software may facilitate the autonomous or otherwise assisted return of the UAV to a dock (e.g., the dock 106 shown in FIG. 1) associated with the UAV. For example, upon completion of a flight, the RPIC may transmit a command, via controller (e.g., the controller 104 shown in FIG. 1), instructing the UAV to return to the associated dock for docking (i.e., landing). The dock verification and landing software 1000 includes an image feature detection tool 1002, a dock selection tool 1004, a UAV placement determination tool 1006, and a landing operation performance tool 1008. The tools 1002 through 1008 represent various functionality of the dock verification and landing software 1000 and are non-limiting as to a particular structure or other expression of code, script, or the like.

The image feature detection tool 1002 is configured to identify the dock by processing one or more images captured using a camera of the UAV (e.g., a navigation or gimballed camera). In particular, the image feature detection tool performs feature detection against the one or more images captured to identify one or more docks within an environment in which the UAV is in flight and to identify depictions of one or more fiducials on one or more of those identified docks. For example, A dock, as described above with respect to FIG. 4, includes a first fiducial generally located on top of a main body portion of the dock (e.g., the fiducial 414 shown in FIG. 4) and a second fiducial generally located on a cradle of the dock (e.g., the fiducial 404 shown in FIG. 4). The first fiducial and the second fiducial encode different information usable by a UAV to perform a landing operation in connection with the dock. In particular, the first fiducial encodes information usable by the UAV to identify the dock, for example, based on a numerical identifier associated with the dock, and the second fiducial encodes information usable by the UAV to determine a UAV placement representing positional, orientational, and like pose information for the UAV to use for landing at the dock (e.g., atop or otherwise within the cradle). In some implementations, the first fiducial and/or the second fiducial may encode information other than or in addition to that which is as described above. For example, the first fiducial may also encode the information usable to determine the UAV placement. The one or more images may be static images or video frames of a video stream captured using the camera of the UAV. In some cases, a single image may depict both of the first fiducial and the second fiducial. In other cases, a first image may depict the first fiducial and a second image may depict the second fiducial.

The dock selection tool 1004 decodes the information encoded by the first fiducial to determine to use the dock for a landing operation for the UAV based on the depiction of the first fiducial within the one or more images. In particular, there may be multiple docks located within the environment in which the UAV is operating, and the dock selection tool 1004 can identify the appropriate dock for the landing operation based on the depiction of the first fiducial within the one or more images captured using the camera of the UAV. For example, the dock selection tool 1004 may determine an association between a UAV and its corresponding dock by determining a numerical identifier encoded by the first fiducial (e.g., based on a stored record associating the numerical identifier with the dock and/or the UAV). In one non-limiting example, the UAV may be paired with a dock, causing the UAV to store in local memory information representing the numerical identifier of the dock. The dock selection tool 1004 can process the depicted first fiducial to determine whether the numerical identifier associated therewith matches the one stored in local memory at the UAV. Upon such a match, the dock is identified as the appropriate one to use for the landing operation for the UAV.

In some implementations, based on the identification of the dock for the landing operation, as described above, the dock verification and landing software 1000 may cause a door of the dock to open to prepare the dock to receive the UAV or otherwise to cause a slider on which the cradle is mounted to extend outside of an enclosure of the dock. For example, the UAV may, upon the identification of the dock, transmit a signal configured to cause a processing device of the dock to open a door thereof and/or extend a slider thereof. In some such cases, a second image of the one or more images, depicting the second fiducial, may be captured after this UAV-to-dock communication occurs.

The UAV placement determination tool 1006 determines a UAV placement for the landing operation at the dock. In particular, the UAV placement determination tool 1006 decodes the information encoded by the second fiducial to determine the UAV placement based on positional, orientational, and like pose information associated with the second fiducial. The UAV placement information may be expressed in a variety of formats but generally includes information usable by the UAV to automatically calculate a flight path from its current location in the air to the portion of the dock at or on which it will land (e.g., the cradle).

The landing operation performance tool 1008 then performs, or otherwise causes a performance of, a landing operation according to the UAV placement to cause the UAV to land at the dock. For example, the landing operation performance 1008 may use the data provided by the UAV placement determination 1006 in addition to the autonomous navigation tool 604 shown in FIG. 6 to safely perform the landing operation. The landing operation performance 1008 may communicate with the associated dock via a wireless network. The landing operation performance 1008 may send instructions (i.e., requests) to the associated dock such that the dock may prepare for a landing operation performed by or otherwise for the UAV 1106.

In some implementations, the dock verification and landing software 1000 may interface with frontend user software running at a user device or other controller associated with the UAV. For example, the frontend user software may include one or more user interfaces enabling an RPIC to create missions, fly the UAV, set waypoints, enable GPS returns, or the like.

Figure 11:
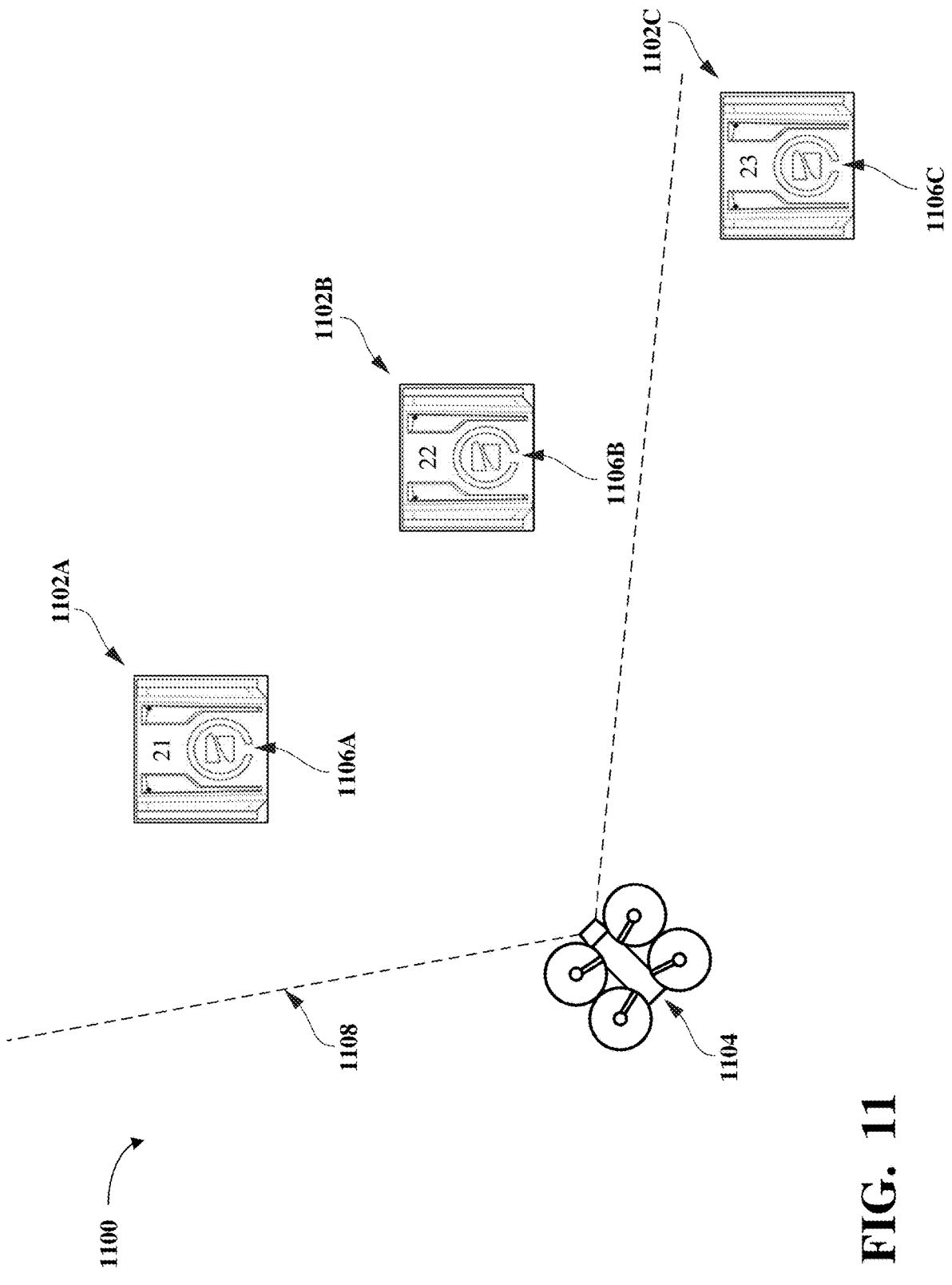
FIG. 11 is an illustration an environment within which multiple docks 1102A-1102C are located while a UAV is in flight.

FIG. 11 is an illustration of an environment 1100 within which multiple docks 1102A-1102C are located while a UAV 1104 is in flight. The docks 1102A-1102C are each depicted with an associated first fiducial 1106A-1106C located on the top of the dock. The UAV 1104 has a camera with a field of view 1108 representing a region within the environment 1100 which is presently observable by a camera of the UAV, enabling image capture depicting various aspects of the environment 1100. The UAV 1104 may, for example, be the UAV 200 shown in FIGS. 2A-B. As the UAV 1104 approaches the multiple docks 1102A-C, one or more of the multiple docks 1102A-1102C may enter within the field of view 1108. In the example shown, the dock 1102A and the dock 1102B may be within the field of view 1108 of the UAV 1104, while the dock 1102C remains outside of the field of view 1108. As such, the UAV 1104 may be able to capture one or more images of the docks 1102A and 1102B and process those one or more images to identify a first fiducial on each of the docks 1102A and 1102B. In this example, the UAV 1104 may identify the dock 1102A using the first fiducial 1106A as having the numerical identifier 21 and the dock 1102B using fiducial 1106B as having the numerical identifier 22. The UAV 1104 may select the dock from the identified docks as being the dock associated with the UAV 1104 and resultingly perform a landing operation at that dock. Alternatively, the UAV 1104 may not be associated with dock 1102A or dock 1102B. As such, the UAV 1104 may continue to move around the environment 1100, scanning for additional docks. For example, the UAV 1104 may turn clockwise rotating the field of view 1108 clockwise until the dock 1102C is within the field of view 1108. The UAV 1104 may then capture one or more images depicting the fiducial 1106C located on the top of the dock 1102C and accordingly determine the numerical identifier associated with the fiducial 1106C to be 23. The UAV may thus determine that the dock 1102C is the associated dock for the UAV 1104 based on the numerical identifier associated with the fiducial 1106C, and may resultingly perform a landing operation at the dock 1102C.

Figure 13:
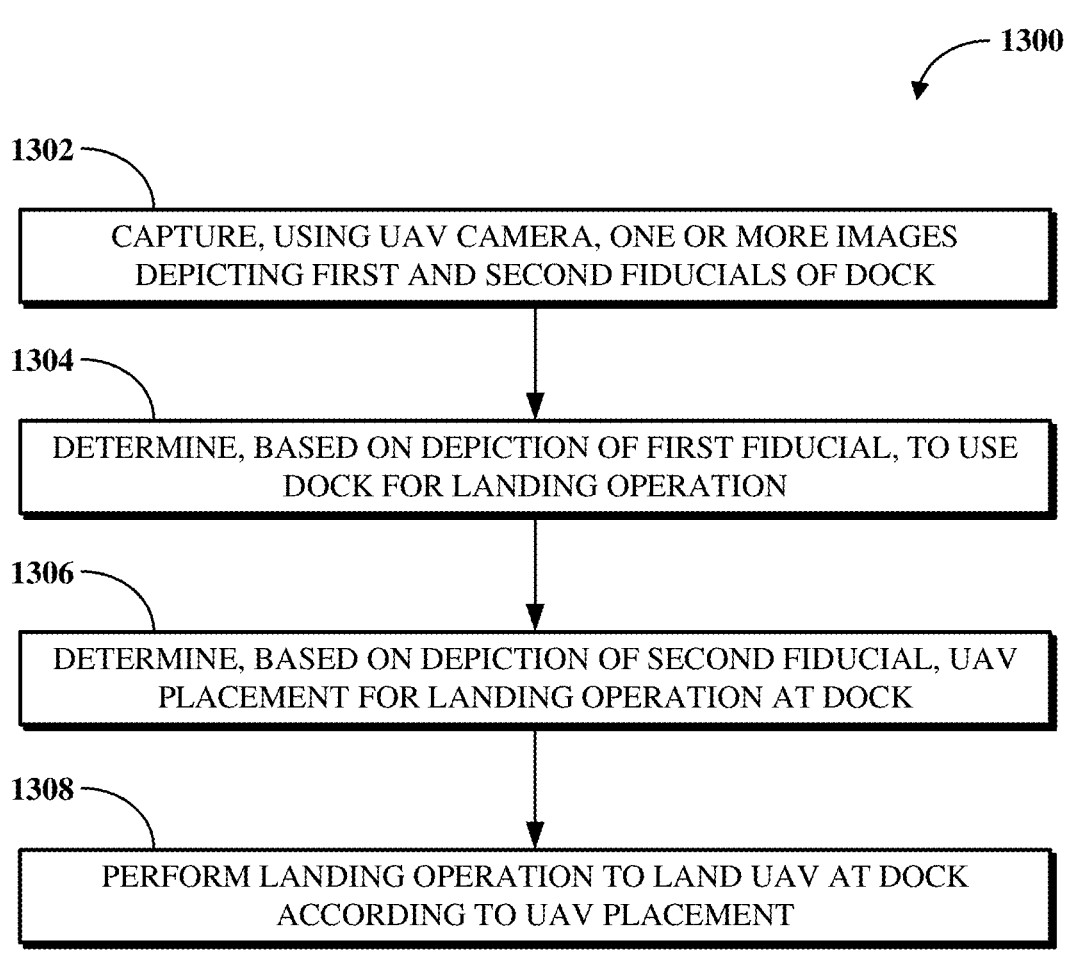
FIG. 13 is a flowchart of an example of a technique for automated UAV dock verification and landing.

To further describe some implementations in greater detail, reference is next made to examples of techniques for automated UAV dock operations, for example, as described with respect to FIGS. 1-11. FIG. 12 is a flowchart of an example of a technique 1200 for automated pre-flight UAV inspection. FIG. 13 is a flowchart of an example of a technique 1300 for automated UAV dock verification and landing.

The techniques 1200 and/or 1300 can be executed using computing devices, such as the systems, hardware, and software described with respect to FIGS. 1-11. The techniques 1200 and/or 1300 can be performed, for example, by executing a machine-readable program or other computer-executable instructions, such as routines, instructions, programs, or other code. The steps, or operations, of the techniques 1200 and/or 1300, or another technique, method, process, or algorithm described in connection with the implementations disclosed herein can be implemented directly in hardware, firmware, software executed by hardware, circuitry, or a combination thereof. For example, the technique 1200 can be implemented in whole or in part by the pre-flight inspection software 900 shown in FIG. 9. Instructions for performing the technique 1200 can be stored in a processing device (e.g., including processing device 706 shown in FIG. 7) that can be executed by processing circuitry (e.g., including processing device 706 shown in FIG. 7). The technique 1200 may be implemented in whole or in part by a dock (e.g., at the dock 702 shown in FIG. 7). In another example, the technique 1300 can be implemented in whole or in part by the dock return software 1000 shown in FIG. 10. Instructions for performing the technique 1300 can be stored in a processing device (e.g., including processing apparatus 502 shown in FIG. 5) that can be executed by processing circuitry (e.g., including processing apparatus 502 shown in FIG. 5). The technique 1300 may be implemented in whole or in part by a UAV (e.g., at the UAV 200 of FIGS. 2A-B).

For simplicity of explanation, the techniques 1200 and 1300 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 12, a flowchart of an example of the technique 1200 for automated pre-flight UAV inspection is shown. At 1202, instructions are obtained to use a dock to perform an automated pre-flight inspection of a UAV while the UAV is located at the dock. The instructions correspond to a request for the pre-flight inspection and may be obtained from a computing device, such as a server device or a user device. For example, the request may be obtained per a periodic schedule for performing pre-flight inspections for the UAV (e.g., prior to a first flight each day or week for that UAV). In such a case, the request may be initiated at a computing device configured according to that periodic schedule. In another example, the request may be obtained per an event, for example, a user requesting the performance of the pre-flight inspection or a determination that the UAV is being prepared for a flight. In such a case, the request may be initiated at a user device or at the dock itself. In some cases, where the request is obtained per a periodic schedule, the periodicity for the schedule may be dynamically adjusted following the pre-flight inspection. For example, a short term period may be defined within which all planned flights for a UAV require a pre-flight inspection, after which a pre-flight inspection may instead be performed on a once daily or weekly basis, and after which a longer interval may be used or the schedule may be replaced with event-based monitoring.

At 1204, one or more sensors are activated for use with the automated pre-flight inspection. For example, to perform a pre-flight inspection the UAV, the dock may need to activate image sensors (i.e., cameras), color sensors, heat sensors, or the like, of the dock and/or of the UAV. Activating the one or more sensors can, for example, include determining the one or more sensors to use for the pre-flight inspection. For example, the pre-flight inspection may be defined to evaluate all components and sub-systems of the UAV, in which case all available sensors may be activated. In another example, the pre-flight inspection may be defined to evaluate only components and sub-systems associated with UAV navigation, in which case a limited number of sensors usable for inspecting a navigation camera of the UAV, propellers of the UAV, and a propulsion system of the UAV may be activated. In such cases, the instructions obtained for the pre-flight inspection may specify the components and/or sub-systems to inspect. In some cases, along with the activation of the one or more sensors, lighting at the dock may be activated to provide light for the pre-flight inspection. For example, LED lights internal and/or external to an enclosure of the dock may be activated and switched to maximum brightness.

At 1206, an automated pre-flight inspection of the UAV is performed at the dock using the sensors. Performing the automated pre-flight inspection includes using the sensors and, in at least some cases, controlling aspects of the UAV to determine operational states of those aspects, in which the operational states correspond to individual UAV aspects and represent functional and/or damage conditions thereof. For example, performing the pre-flight inspection can include using one or more cameras of the UAV to determine, for each of those cameras, whether a lens of the camera is clean. In another example, performing the pre-flight inspection can include using one or more sensors and UAV aspects to determine, for each of one or more sub-systems of the UAV, a condition of the sub-system. In yet another example, performing the pre-flight inspection can include using one or more cameras of the dock and/or of the UAV to determine, for each of one or more portions of a frame of the UAV, an extent of damage to the portion of the frame. Performing the pre-flight inspection of the UAV can thus include, in at least some cases, inspecting one or more sub-systems of the UAV, such as one or more of a propulsion system, an electrical system, a vision system, a navigation system, a command and control system, or a battery system. For example, to test a propulsion system, the inspection may include performing a spin-up test of the propulsion system to ensure the propellers are operating at the proper speeds and that no faults are detected in the motors of the propellers. In another example, to test the battery system, the inspection may include measuring a current level of charge of the battery to ensure that the UAV has sufficient battery life for a flight. In some cases, the operational state of the UAV may be determined based on each individual system inspected of for the UAV as a whole. In some cases, performing the pre-flight inspection can include using a slider of the dock to move the UAV within or otherwise about a dock, for example, to enable visual inspection of portions of the UAV otherwise inaccessible based on camera positions.

Non-limiting examples of operations performed as part of the pre-flight inspection performed at the dock can include determining whether each of one or more cameras of the UAV are clean and free of obscuration, determining whether some or all of the body of the UAV is free of damage, determining whether each of one or more arms of the UAV is free of damage and properly extended (as applicable), determining whether each of one or more propellers of the UAV is free of damage and capable of spinning in an expected manner, determining whether a payload of the UAV is attached and correctly oriented, determining whether an operating environment for the UAV is free of atmospheric and lighting concerns, and determining whether an area proximate to the dock usable for a launch operation of the UAV is free of persons, obstructions, hazards, and the like.

At 1208, automated pre-flight inspection output representative of the operational state(s) of the inspected UAV components and/or sub-systems is generated. As described above, and as the inspection is performed the one or more systems of the UAV, the operational state of each system (e.g., pass, fail, unknown) is determined. Those operational states may be used to generate a report or a checklist indicating the operational state of the UAV. For example, the operation 1208 may determine that propulsion system, electrical system, vision system, navigation system, command and control system all pass inspection, but that battery state is below acceptable levels for flight. In such a case, the operational state of each system may be indicated as passed except for the battery state. Since the battery state did not pass inspection, the operational state of the UAV may thus in some cases be reported as failed.

At 1210, the automated pre-flight inspection output is transmitted for storage or display. The automated pre-flight inspection output may be transmitted to the controller 104, the server 108 shown in FIG. 1, or a combination thereof. That is, the automated pre-flight inspection output may be displayed to the computing device that requested the computing device be performed and the automate pre-flight inspection output may be stored for later review. The automated pre-flight inspection output may be in portable document format, a comma separates values format, a text file format, an HTML format, or the like. For example, the output may be represented within a user interface rendered for display at a user device, such as within a checklist format. The automated pre-flight inspection output may be displayed on a computing device in a read-only (i.e., non-editable) format or the automated pre-flight inspection output may be displayed on the computing device in an interactive (i.e., editable) format. In some implementations, a launch operation for the UAV to exit the dock may be enabled based on the output. In some cases, based on certain conditions being identified based on the pre-flight inspection, an automated launch operation for the UAV may be prevented. For example, the automated launch operation may be prevented where one or more of the following conditions is identified by the pre-flight inspection: insufficient battery remaining (i.e., below a minimum battery threshold or other state), propulsion electronic speed controller fault or motor fault on a spin-up test of the propulsion system, obstacle avoidance fault, or obstruction in launch flightpath or hazard area. In some such cases, the RPIC may be provided the option (e.g., via a user interface rendered for display at their user device) to manually enable the launch operation notwithstanding one or more of these conditions. For example, the RPIC may be prompted to indicate within the user interface (e.g., via a checkbox) that the condition is or is not satisfied. In some such cases, the RPIC may be prompted to verify the condition using a video stream captured using a camera of the dock or UAV. Such approaches may, for example, enable fully remote flight operations under Part 107 waivers as established by the FAA.

In some implementations, the automated pre-flight inspection output may require signoff and/or remote acknowledgement from an RPIC. The automated pre-flight checks may be configurable. For example, certain elements of the pre-flight inspection can be assumed without further verification, and others may be validated via a video feed and system health checks performed by the technique 1200.

In some implementations, one or more video streams captured using one or more cameras accessible to the dock may be transmitted in real-time or substantially in real-time for viewing at a computing device, for example, a user device of an RPIC. In some implementations, one or more such video streams may be, or continue to be (as applicable), so transmitted during a flight of the UAV to enable the RPIC to manually determine whether to return to the UAV to the dock (e.g., based on an issue with the UAV or the operating environment during flight).

In some implementations, remote operations can be initiated after the pre-flight inspection is performed to enable a manual, remote inspection of one or more aspects of the UAV using one or more video streams captured using one or more cameras accessible to the dock. For example, a video stream captured in real-time or substantially real-time using a navigation camera of the UAV can be transmitted to a user device of an RPIC to enable the RPIC to remotely and visually inspect one or more aspects of the UAV (e.g., propeller conditions, latch states, arm positions, etc.) while a door to the dock remains open and the UAV is at close approach to the camera. In some such implementations, such a video stream can be reviewed to ensure that a launch area proximate to the dock is clear for a launch operation and/or that the UAV arms are fully extended to prepare for a launch operation from the dock.

Referring next to FIG. 13, a flowchart of an example of the technique 1300 for automated UAV dock verification and landing is shown. At 1302, one or more images are captured using a camera of a UAV flying within an environment. The one or more images may each be a static image or a video frame of a video stream. Where multiple images are captured, they may be captured consecutively or non-consecutively. For example, one or more intermediary images (as static images or video frames of a video stream) may be captured between ones of those multiple images. The one or more images depict one or more docks located within the environment in which the UAV is flying. In particular, the one or more images depict, for at least one such dock, a first fiducial of the dock and a second fiducial of the dock. The first fiducial may, for example, be located atop the dock, such as on a main body portion thereof. The second fiducial may, for example, be located atop a cradle of the dock. In some implementations, the capture of the images may be based on a scan of a ground area within the environment in which the UAV is navigating.

At 1304, based on a depiction of the first fiducial within the one or more images (e.g., a first image thereof), a determination is made to use the dock for a landing operation for the UAV. That is, the UAV may use the first fiducial of a dock depicted within the one or more images to determine whether the dock corresponds to the UAV. In particular, to determine to use the dock for the landing operation, an image of the one or more images may be processed to identify the first fiducial of the dock, and the dock may be verified for the landing operation according to an identifier (e.g., a numerical identifier) corresponding to the first fiducial, in which different fiducials located on other docks correspond to different identifiers. In some cases, processing the image to identify the first fiducial can include predicting the first fiducial based on an arrangement of dots depicted within the image. In some cases, verifying the dock for the landing operation according to the identifier can include determining, based on the identifier associated with the first fiducial, that the UAV launched from the dock. For example, the dock may be paired with the UAV prior to or as a result of a launch operation, and this may pairing may be used to verify the dock.

At 1306, based on a depiction of the second fiducial within the one or more images (e.g., a first or second image thereof), a UAV placement is determined for a landing operation to perform at the dock. That is, the UAV may use the second fiducial of the dock depicted within the one or more images and verified for the landing operation to determine pose information for the UAV to use to land at the dock. For example, the second fiducial may encode information related to a location of the cradle of the dock and/or a pitch, yaw, and/or roll of the cradle relative to the UAV. The UAV placement may thus be determined by processing the one or more images to identify the second fiducial of the dock, verifying positional information, as described above, of the cradle according to an identifier corresponding to the second fiducial, and determining the UAV placement based on the positional information.

In some implementations, the UAV placement information may be determined using the first fiducial, for example, in addition to or as an alternative to the use of the second fiducial therefor. For example, the first fiducial may encode information usable to both identify the dock for the landing operation and determine the UAV placement for the landing operation.

At 1308, a landing operation is performed to land the UAV at the dock according to the UAV placement. For example, the landing operation may be determined based on the UAV placement, such as by the UAV calculating a flight path from its current location to the dock according to the UAV placement (i.e., so as to ultimately be oriented and positioned according to the UAV placement). Thus, performing the landing operation may include adjusting one or more of a position for the UAV, a roll for the UAV, a pitch for the UAV, or a yaw for the UAV according to the UAV placement.

In some implementations, the technique 1300 may be performed for surfaces or structures other than docks as disclosed herein. For example, the technique 1300 may be performed to cause a UAV to land at or otherwise on a landing pad, pedestal, case, or the like. In such a case, the first and second fiducials as described above will be located in places of those other surfaces or structures so as to enable identifications thereof as described above.

In some implementations, the technique 1300 may include the UAV transmitting a signal to the dock to cause a door of the dock to open, such as to prepare the dock for the landing operation at the dock. For example, the UAV may transmit the signal responsive to or otherwise based on one of the determination to use the dock for the landing operation or the determination of the UAV placement.

In some implementations, one or more lights of the dock may illuminate according to a low-light condition of the environment within the UAV is flying (e.g., the onset of evening or nighttime where the environment is outdoors) or in response to a UAV or a person moving within a near proximity of the dock. In some implementations, the UAV can localize its scan of the environment within which it is flying according to features in the environment (e.g., landmarks, trees, structures, or the like). In some implementations, the identification of a dock may be based on a number indicated atop the dock, for example, in addition to or instead of via the first fiducial. For example, object detection and recognition may be performed against one or more images captured using a camera of the UAV to identify the number within a bounding box. In some implementations, following the completion of the landing operation, a post-flight inspection can be performed. In some implementations, before the UAV takes off, a measurement of orientation of the UAV (e.g., via an IMU, VIO, pogo pins, or the like) may be recorded. That measurement may be compared to a similar measurement recorded following the landing operation to determine whether the UAV landed at a different angle. In some implementations, where multiple fiducials appear to look the same, a three-dimensional estimation can be performed to inspect the dock to determine whether to use it for the landing operation.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices.

Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system for automated unmanned aerial vehicle (UAV) dock verification and landing, the system comprising:

a dock including a body and a cradle configured to extend beyond the body to receive a UAV and to retract within the body in response to receiving the UAV, wherein a first fiducial is located on the body and a second fiducial is located on the cradle; and a UAV including a camera, one or more processors, and one or more memories, wherein the one or more processors are configured to execute instructions stored in the one or more memories to:

determine to use the dock for a landing operation by processing a first image, captured using the camera, depicting the first fiducial;

determine a UAV placement for the landing operation at the dock by processing a second image, captured using the camera, depicting the second fiducial; and perform the landing operation to land the UAV at the dock according to the UAV placement, wherein the first fiducial is used to identify the dock from amongst multiple docks within an environment in which the UAV is navigating while the first image is captured.

2. The system of claim 1, wherein, to determine to use the dock for the landing operation, the one or more processors are configured to execute the instructions to:

process the first image to identify the first fiducial; and verify the dock for the landing operation according to an identifier corresponding to the first fiducial, wherein different fiducials located on other docks of the multiple docks correspond to different identifiers.

3. The system of claim 2, wherein, to process the first image to identify the first fiducial, the one or more processors are configured to execute the instructions to:

predict the first fiducial based on an arrangement of dots depicted within the first image.

4. The system of claim 2, wherein, to verify the dock for the landing operation according to an identifier, the one or more processors are configured to execute the instructions to:

determine, based on the identifier, that the UAV launched from the dock.

5. The system of claim 1, wherein the one or more processors are configured to execute the instructions to:

scan a ground area within the environment to identify the multiple docks.

6. The system of claim 1, wherein, to determine the UAV placement for the landing operation at the dock, the one or more processors are configured to execute the instructions to:

process the second image to identify the second fiducial;

verify positional information of the cradle according to an identifier corresponding to the second fiducial; and determine the UAV placement based on the positional information.

7. The system of claim 6, wherein, to perform the landing operation to land the UAV at the dock according to the UAV placement, the one or more processors are configured to execute the instructions to:

adjust one or more of a position for the UAV, a roll for the UAV, a pitch for the UAV, or a yaw for the UAV according to the UAV placement.

8. The system of claim 6, wherein the positional information corresponds to one or more of locations of one or more corners of the cradle or an orientation of the cradle in a three-dimensional space.

9. The system of claim 1, wherein the determination to use the dock for the landing operation causes a door of the dock to open and causes the cradle to extend beyond the body.

10. An unmanned aerial vehicle (UAV) configured for automated UAV dock verification and landing, the UAV comprising:

one or more cameras;

one or more memories; and one or more processors configured to execute instructions stored in the one or more memories to:

capture, using the one or more cameras, one or more images within an environment in which the UAV is navigating;

determine that the one or more images depict a first fiducial of a dock within the environment;

determine, based on the depiction of the first fiducial, to use the dock for a landing operation;

determine that the one or more images depict a second fiducial of the dock;

determine, based on the depiction of the second fiducial, a UAV placement for the landing operation at the dock; and perform the landing operation to land the UAV at the dock according to the UAV placement, wherein the first fiducial is used to identify the dock from amongst multiple docks within the environment.

11. The UAV of claim 10, wherein at least some of the one or more images are captured based on a scanning operation identifying the dock within the environment.

12. The UAV of claim 10, wherein the UAV placement specifies one or more of a position for the UAV, a roll for the UAV, a pitch for the UAV, or a yaw for the UAV.

13. The UAV of claim 10, wherein the first fiducial is located on a body of the dock and the second fiducial is located on a cradle configured to receive the UAV.

14. A method for automated unmanned aerial vehicle (UAV) dock verification and landing, the method comprising:

obtaining, using a camera of a UAV, one or more images depicting a first fiducial of a dock and a second fiducial of the dock;

determining, according to the depiction of the first fiducial within the one or more images, to use the dock for a landing operation for the UAV;

determining, according to the depiction of the second fiducial within the one or more images and based on the determination to use the dock for the landing operation, a UAV placement for the landing operation at the dock; and causing, based on the UAV placement, a performance of the landing operation to land the UAV at the dock, wherein the first fiducial is used to identify the dock from amongst multiple docks within an environment in which the UAV is navigating while the first image is captured.

15. The method of claim 14, wherein determining to use the dock for the landing operation for the UAV comprises:

verifying the dock for the landing operation from amongst the multiple docks.

16. The method of claim 15, wherein verifying the dock for the landing operation comprises:

determining an identifier corresponding to the first fiducial; and determining, using the identifier, that the UAV launched from the dock.

17. The method of claim 14, wherein determining the UAV placement for the landing operation at the dock comprises:

determining a manner by which to orient and position the UAV based on information associated with the second fiducial.

18. The method of claim 17, wherein the first fiducial is located on a body of the dock and the second fiducial is located on a cradle configured to receive the UAV.

19. The method of claim 14, wherein determining to use the dock for the landing operation for the UAV comprises:

predicting the first fiducial based on the first image.

20. The method of claim 16, comprising:

scanning the environment to identify the multiple docks.

* * * * *